(12) United States Patent
Su et al.

(10) Patent No.: US 11,662,548 B2
(45) Date of Patent: May 30, 2023

(54) LENS DRIVING APPARATUS AND ELECTRONIC DEVICE

(71) Applicant: LARGAN DIGITAL CO., LTD., Taichung (TW)

(72) Inventors: Heng-Yi Su, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 309 days.

(21) Appl. No.: 17/038,096

(22) Filed: Sep. 30, 2020

(65) Prior Publication Data
US 2021/0302689 A1 Sep. 30, 2021

(30) Foreign Application Priority Data
Mar. 31, 2020 (TW) .................................. 109111062

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
None
See application file for complete search history.

(56) References Cited

U.S. PATENT DOCUMENTS

| | | |
|---|---|---|
| 8,233,083 B2 | 7/2012 | Takatsuka et al. |
| RE44,371 E | 7/2013 | Honma |
| 8,498,070 B2 | 7/2013 | Ke |
| 8,503,121 B2 | 8/2013 | Osaka et al. |
| 8,587,675 B2 | 11/2013 | Chiang |
| 8,854,749 B2 | 10/2014 | Chou |
| 8,901,784 B2 | 12/2014 | Ke |
| 9,063,275 B2 | 6/2015 | Park |
| 9,195,026 B1 | 11/2015 | Chen et al. |
| 9,395,510 B2 | 7/2016 | Uno et al. |
| 9,438,801 B2 | 9/2016 | Hwang et al. |

(Continued)

FOREIGN PATENT DOCUMENTS

CN 107884898 B * 4/2021 ............... G02B 7/00

*Primary Examiner* — Darryl J Collins
*Assistant Examiner* — Tamara Y. Washington
(74) *Attorney, Agent, or Firm* — McClure, Qualey & Rodack, LLP

(57) ABSTRACT

A lens driving apparatus includes an imaging lens assembly, a driving mechanism and a carrier element. The imaging lens assembly includes at least one plastic lens element. The plastic element includes an effective optical portion, a peripheral portion and a light-shielding layer. The peripheral portion surrounds the effective optical portion. The light-shielding layer is disposed on an object side of the peripheral and surrounds the effective optical portion. The driving mechanism includes at least one coil and at least one magnet. The magnet is disposed correspondingly with the coil. Both of the plastic element and the one of the coil and the magnet are directly connected with the carrier element. An outer surface of the carrier element includes an assembling structure. The assembling structure is directly contacted with one of the coil and the magnet. The assembling structure and the carrier element are made integrally.

18 Claims, 34 Drawing Sheets

(56) References Cited

U.S. PATENT DOCUMENTS

| | | |
|---|---|---|
| 9,455,617 B2 | 9/2016 | Park |
| 9,575,329 B2 | 2/2017 | Kim et al. |
| 9,601,968 B2 | 3/2017 | Song et al. |
| 9,651,797 B2 | 5/2017 | Moriya et al. |
| 10,133,087 B2 | 11/2018 | Park et al. |
| 10,254,627 B2 | 4/2019 | Lee et al. |
| 2019/0011663 A1 | 1/2019 | Weng et al. |

* cited by examiner

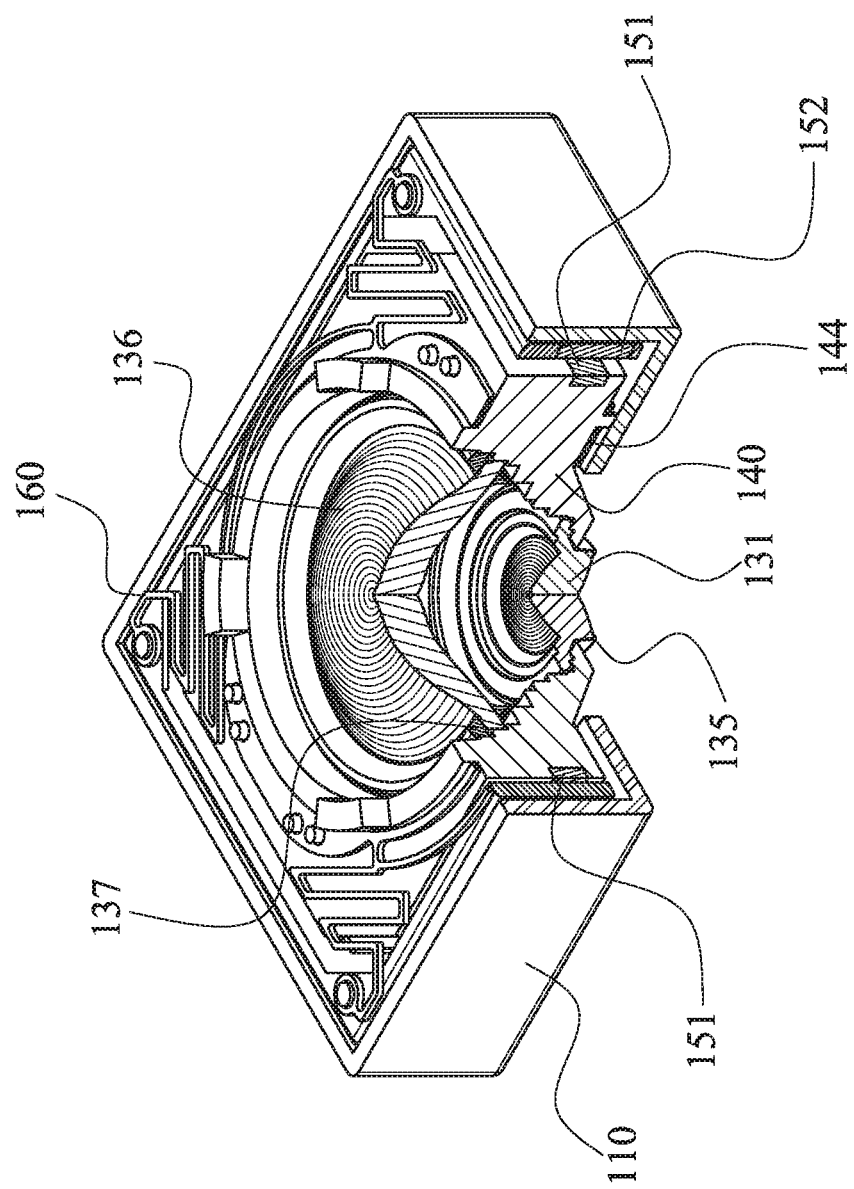

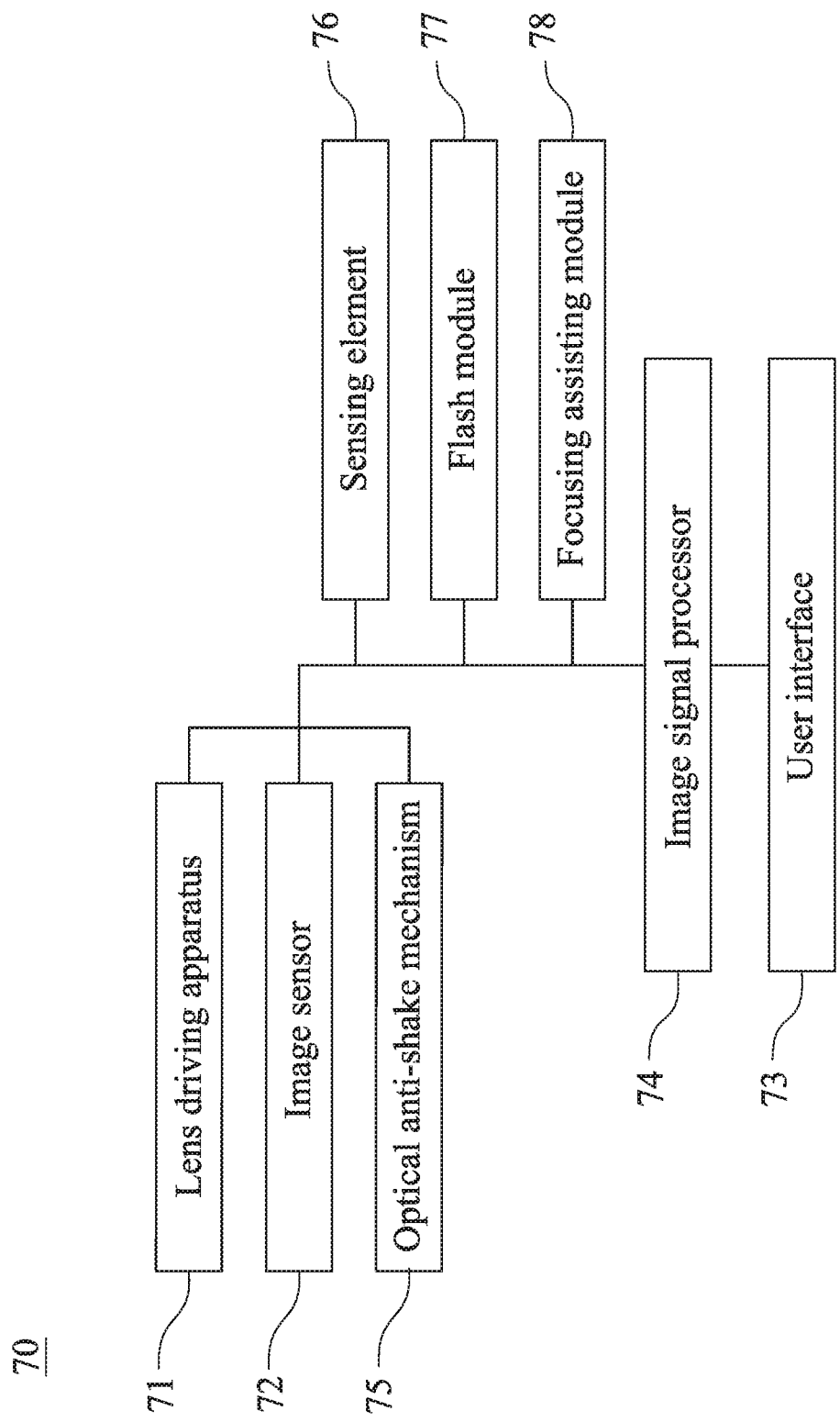

US 11,662,548 B2

LENS DRIVING APPARATUS AND ELECTRONIC DEVICE

RELATED APPLICATIONS

This application claims priority to Taiwan Application Serial Number 109111062, filed Mar. 31, 2020, which is herein incorporated by reference.

BACKGROUND

Technical Field

The present disclosure relates to a lens driving apparatus. More particularly, the present disclosure relates to a lens driving apparatus applicable on a portable electronic device.

Description of Related Art

In recent days, portable electronic devices have developed rapidly. For example, intelligent electronic devices and tablets have been filled in the lives of modern people, and camera modules mounted on portable electronic devices have also prospered. However, as technology advances, the quality requirements of lens driving apparatus are becoming higher and higher. Therefore, developing a carrier element for combining a lens barrel and a lens driving apparatus with a carrier function is needed.

SUMMARY

According to one aspect of the present disclosure, a lens driving apparatus includes an imaging lens assembly, a driving mechanism and a carrier element. The imaging lens assembly has an optical axis and includes at least one plastic lens element. There is no additional one or more lens elements between an imaged object and the plastic lens element. The plastic element includes, in order from a central region to a peripheral region, an effective optical portion, a peripheral portion and a light-shielding layer. The optical axis of the imaging lens assembly passes through the effective optical portion. The peripheral portion surrounds the effective optical portion. The light-shielding layer is disposed on an object side of the peripheral portion of the plastic lens element and surrounds the effective optical portion. The driving mechanism includes at least one coil and at least one magnet, wherein the magnet is disposed correspondingly with the coil. A driving magnetic force is generated by an interaction between the coil and the magnet, so that the imaging lens assembly can be driven to move along a direction parallel to the optical axis by the driving mechanism. The carrier element is for configuring the imaging lens assembly and one of the at least one of the coil and the at least one of the magnet of the driving mechanism, and both of the plastic element and the one of the coil and the magnet are directly connected with the carrier element. An outer surface of the carrier element includes an assembling structure, wherein the assembling structure is directly contacted with one of the coil and the magnet. The assembling structure is for arranging the coil and the magnet facing towards each other. The assembling structure and the carrier element are made integrally. A part of the light-shielding layer does not overlap with the carrier element in a direction perpendicular to the optical axis. The carrier element further includes a top surface, the top surface extends along the direction perpendicular to the optical axis and faces towards an object side of the lens driving apparatus. When an extending distance of the light-shielding layer from the top surface to the object side of the lens driving apparatus along the direction parallel to the optical axis is H, and a central thickness of the plastic lens element is CT, the following condition is satisfied: $0 < H/CT < 3$.

According to one aspect of the present disclosure, an electronic device includes the aforementioned lens driving apparatus.

BRIEF DESCRIPTION OF THE DRAWINGS

The present disclosure can be more fully understood by reading the following detailed description of the embodiment, with reference made to the accompanying drawings as follows:

FIG. 1G is a partial sectional view of the image side of the lens driving apparatus according to the 1st embodiment in FIG. 1A.

FIG. 7B is a block diagram of the electronic device according to the 7th embodiment of FIG. 7A.

DETAILED DESCRIPTION

Figure 1A:
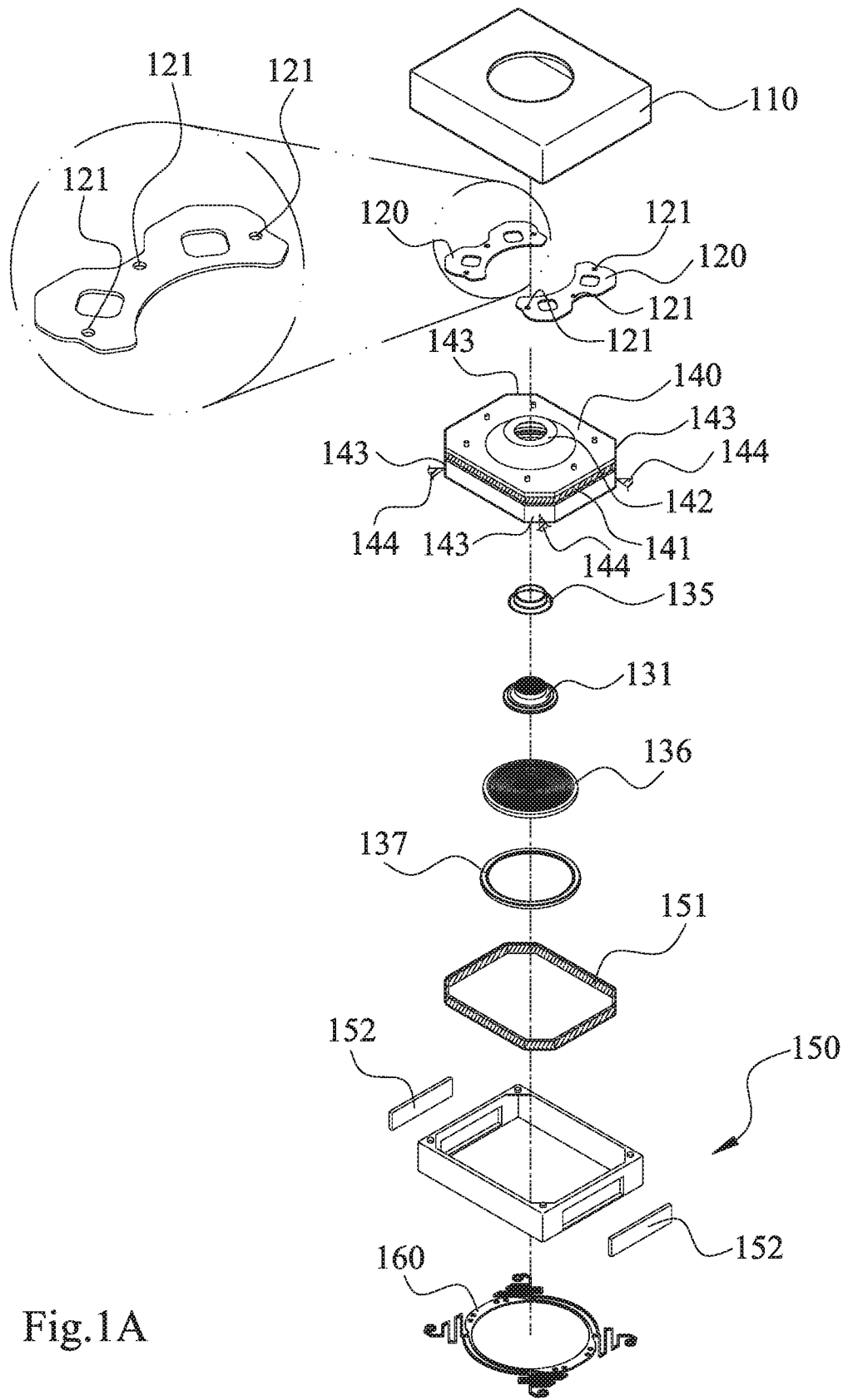
FIG. 1A is one exploded view of a lens driving apparatus according to a 1st embodiment of the present disclosure.

The present disclosure provides a lens driving apparatus including an imaging lens assembly, a driving mechanism and a carrier element. The imaging lens assembly has an optical axis and includes at least one plastic lens element. There is no additional one or more lens elements between an imaged object and the plastic lens element. The plastic element includes, in order from a central region to a peripheral region, an effective optical portion, a peripheral portion and a light-shielding layer. The optical axis of the imaging lens assembly passes through the effective optical portion. The peripheral portion surrounds the effective optical portion. The light-shielding layer is disposed on an object side of the peripheral portion of the plastic lens element and surrounds the effective optical portion. The driving mechanism includes at least one coil and at least one magnet, wherein the magnet is disposed correspondingly with the coil. A driving magnetic force is generated by an interaction between the coil and the magnet, so that the imaging lens assembly can be driven to move along a direction parallel to the optical axis by the driving mechanism. The carrier element is for configuring the imaging lens assembly and one of the at least one of the coil and the at least one of the magnet of the driving mechanism, and both of the plastic lens element and the one of the coil and the magnet are directly connected with the carrier element. An outer surface of the carrier element further includes an assembling structure, wherein the assembling structure is directly contacted with one of the coil and the magnet and is for arranging the coil and the magnet facing towards each other. The assembling structure and the carrier element are made integrally. A part of the light-shielding layer does not overlap with the carrier element in a direction perpendicular to the optical axis. The carrier element further includes a top surface, the top surface extends along the direction perpendicular to the optical axis and faces towards an object side of the lens driving apparatus. When an extending distance of the light-shielding layer from the top surface to the object side of the lens driving apparatus along the direction parallel to the optical axis is H, and a central thickness of the plastic lens element is CT, the following condition is satisfied: 0<H/CT<3. Therefore, the manufacturing feasibility of the injection molding can be increased, and the complexity of the following assembling can be simplified.

Specifically, a direction from the top surface to the object side is defined as positive, and a direction from the top surface to the image side can be defined as negative. The top surface is perpendicular to the optical axis, and the intersection of an extension line of the top surface and the optical axis is a zero point.

Further, the light-shielding layer is originally liquid and is opaque with an adhesion after curing. The light-shielding layer can be a retaining element and can be used to control an amount of an incident light, so as to determine a bundle of the incident light.

The driving magnetic force generated by the interaction between the coil and the magnet can be an electromagnetic driving force, and the driving magnetic force is the Lorentz force generated by electromagnetic interaction.

The carrier element is configured with both of the imaging lens assembly and the driving mechanism simultaneously, so that the functions of the conventional lens barrel and carrier are integrated for reducing producing costs. By configuring both of the imaging lens assembly and the driving mechanism with the carrier element, the assembling processes can be simplified and the manufacturing yield rate can be improved.

A part of the light-shielding layer does not overlap with the carrier element in the direction perpendicular to the optical axis, which can be refer to as the light-shielding layer exposed to the air, or the aforementioned part of the light-shielding layer located at the object side of the carrier element, but the present disclosure will not be limited thereto. Therefore, the light-shielding layer can be adaptively filled into a special spatial configuration between the optical elements for being accumulated at an ideal light-shielding position, thus improving the performance of shielding stray light. Moreover, it is favorable for the miniaturization of the imaging lens assembly by designing the light-shielding layer as a light entrance.

The imaging lens assembly can further include an annular step structure. The annular step structure surrounds the effective optical portion and is in a full-circle form, and the annular step structure is connected with the effective optical portion and the peripheral portion. Specifically, the full-circle form refers to a situation in which the annular step structure surrounds the effective optical portion without disconnection. With the annular step structure in the full-circle form, it is favorable for element demolding so as to improve the flatness of the bearing surface.

A part of the light-shielding layer can be coated on the annular step structure. Specifically, the annular step structure can accumulate the light-shielding layer, so that the optical density of a part of the annular step structure can be increased. Therefore, the image recognition error caused by coating the light-shielding layer can be reduced, and the efficiency of automatic production can be improved.

The lens driving apparatus can further include a leaf spring element. The leaf spring element is assembled with the carrier element and is located at the image side of the carrier element. Therefore, a suitable mechanical support structure and an ideal driving stroke configuration can be designed within a limited space by using the material characteristics.

The lens driving apparatus can further include at least one metal conductive element. The metal conductive element is directly connected with the carrier element and is located at one of the object side and the image side of the carrier element. Specifically, the metal conductive element can be a cushioning member for buffering the temperature gradient and pressure shocks applied to the carrier element during assembling processes, thus increasing the manufacturing yield rate.

The metal conductive element can include at least two positioning holes coupled with the carrier element. Specifically, the metal conductive element can absorb the impact energy generated during assembling processes of the lens driving apparatus, so as to ensure the resolution of the imaging lens assembly would not be affected. With a number of at least two of the positioning holes, the self-rotation of the metal conductive element can be limited so as to improve the assembling efficiency. Therefore, a margin for automatic assembling steps can be provided by the metal conductive element, so that the mechanical assembling processes and electric welding processes can be separately controlled so as to reduce producing costs.

The metal conductive element can be disposed between the carrier element and the leaf spring element. Therefore, the buffering effect is improved.

An appearance of one side of the carrier element facing the image side of the lens driving apparatus can be a polygon. Therefore, a connecting structure of a sensor can be matched, and the convenience of element extraction in automatic producing processes can be improved.

The polygon can be rectangular-shaped, and the polygon being rectangular-shaped has a plurality of chamfered corners. Furthermore, the polygon can also be a hexagon or an octagon, but the present disclosure will not be limited thereto. Therefore, the spatial utilization efficiency of the space inside the lens driving apparatus can be increased.

A number of the coil can be at least two, and the coils are correspondingly disposed along the optical axis of the imaging lens assembly and are disposed on two sides of the polygon being rectangular-shaped which are correspondingly disposed. Therefore, the Lorentz force generated by the electromagnetic interaction can be increased so as to increase the driving efficiency.

At least two gate traces can be disposed on the chamfered corners respectively. Moreover, a number of the gate traces can be at least three, but the location of the gate traces will not be limited thereto. Therefore, a high molding quality can be maintained, and the carrier element with more complicated structures can be molded.

When a length of the light-shielding layer along the direction parallel to the optical axis is L, the following condition can be satisfied: 0 mm<L<1.2 mm. Specifically, the aforementioned range is a more suitable range for automatic coating processes of the light-shielding layer. Therefore, the manufacturing feasibility can be improved. Furthermore, the following condition can be satisfied: 0.1 mm<L<0.9 mm. Specifically, the aforementioned range is for arranging a suitable light-shielding range, so that the design of the carrier element can be simplified and the volume of the object side of the carrier element can be greatly reduced. Hence, the carrier element does not need to completely cover the imaging lens assembly.

When the extending distance of the light-shielding layer from the top surface to the object side of the lens driving apparatus along the direction parallel to the optical axis is H, and the central thickness of the plastic lens element is CT, the following condition is satisfied: 0.1≤H/CT≤2. Specifically, considering the needs of injection molding manufacturing capacity and optical design, the aforementioned more suitable ratio range is proposed. Hence, it is favorable for reducing the volume of the lens driving apparatus.

When an extending distance of the light-shielding layer from the top surface to the image side of the lens driving apparatus along the direction parallel to the optical axis is H2, and the central thickness of the plastic lens element is CT, the following condition is satisfied: −2≤H2/CT≤0. Specifically, considering the needs of injection molding manufacturing capacity and optical design, the aforementioned more suitable ratio range is proposed. Furthermore, the following condition can be satisfied: −1≤H2/CT≤0. Hence, the ink overflowing condition that may occur due to the excessive amount of coating ink can be reduced, and the yield rate of automatic production can be increased.

The peripheral portion of the plastic lens element can further include at least one outer tilting surface, a part of the light-shielding layer is coated on the outer tilting surface. There is at least one angle between the outer tilting surface and the optical axis, and the angle can be between 1 degree and 60 degrees. Specifically, in the peripheral portion of the plastic lens element, any surface that satisfies the condition of the aforementioned angle range can be defined as an outer tilting surface. The design of the outer tilting surface is favorable for mold releasing and element demolding and can provide an accumulating space for coating the light-shielding layer at the same time. Hence, the outer tilting surface allows the plastic lens element to be moved further towards the object side, and it is favorable for achieving miniaturization of the imaging lens assembly.

A number of the outer tilting surface can be N, and a number of the angle between the outer tilting surface and the optical axis can be N. The angles increase in order from the object side of the lens driving apparatus to the image side of the lens driving apparatus, and each of the angles can be between 1 degree and 39 degrees. Hence, an angle of the outer tilting surface with superior light-shielding layer accumulating capability can be designed, and a better light-shielding layer accumulating region located at an ideal light-shielding position can be ensured.

Each of the aforementioned features of the lens driving apparatus of the present disclosure can be utilized in various combinations for achieving the corresponding effects.

The present disclosure provides an electronic device, which includes the aforementioned lens driving apparatus.

According to the aforementioned embodiment, specific examples are provided, and illustrated via figures.

1st Embodiment

Figure 1B:
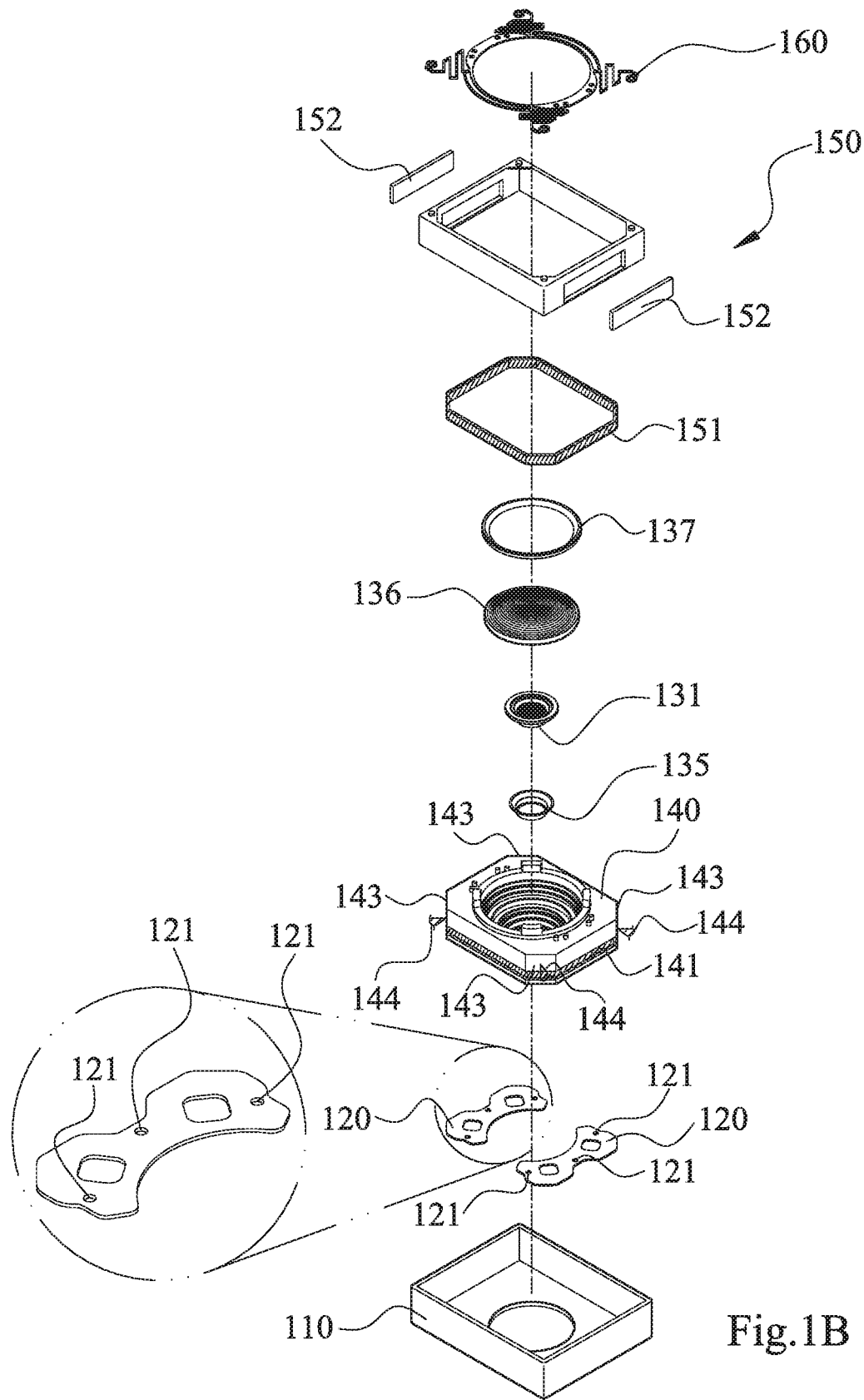
FIG. 1B is another exploded view of the lens driving apparatus according to the 1st embodiment in FIG. 1A.
Figure 1C:
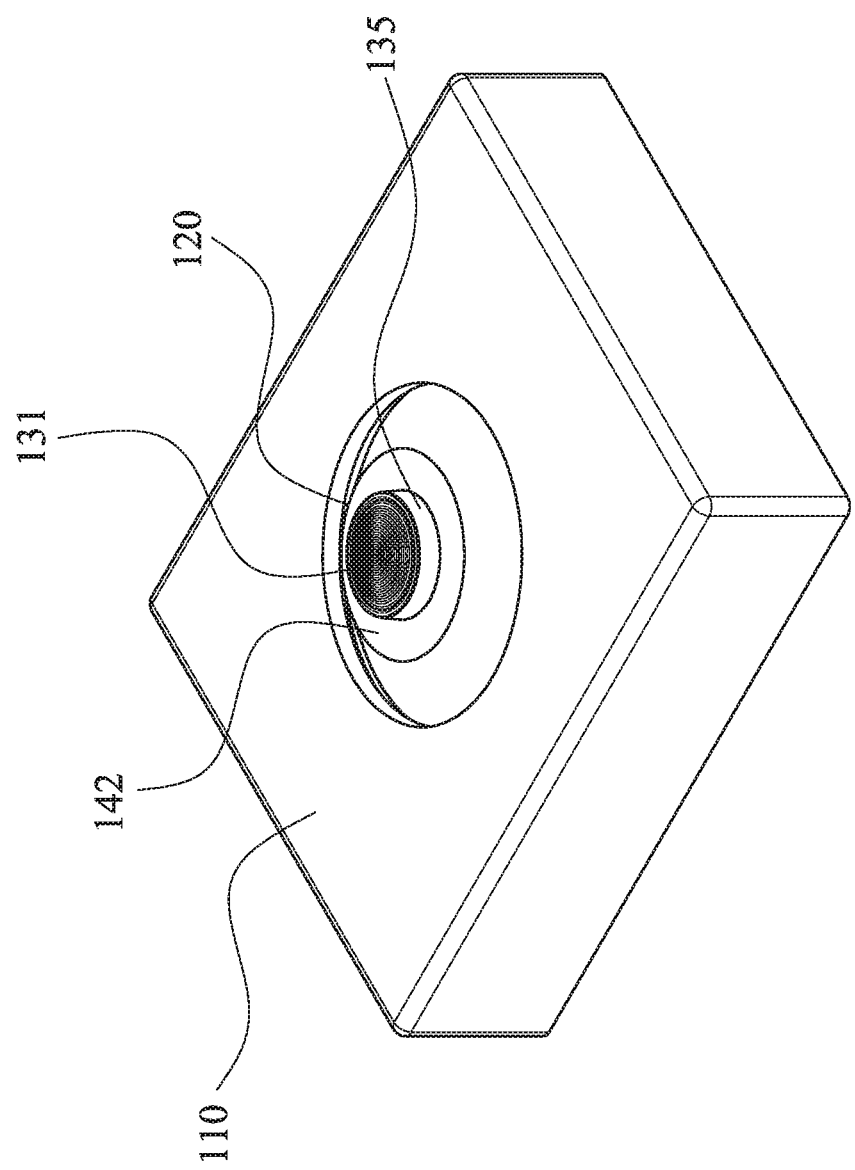
FIG. 1C is an assembling schematic view of an object side of the lens driving apparatus according to the 1st embodiment in FIG. 1A.
Figure 1D:
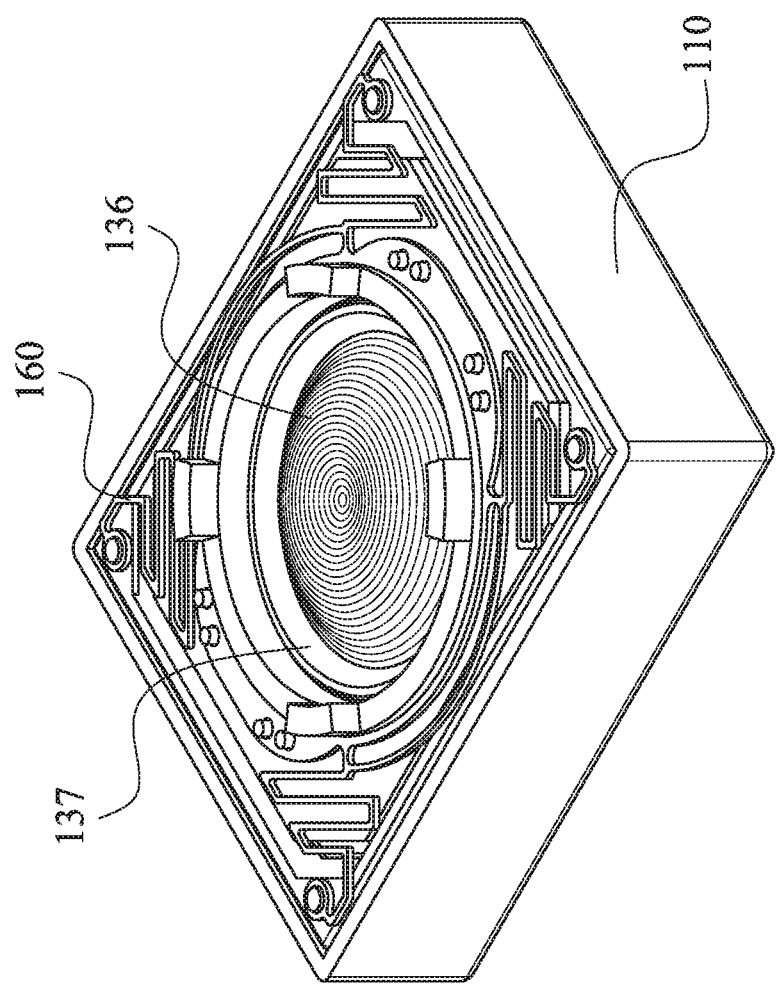
FIG. 1D is an assembling schematic view of an image side of the lens driving apparatus according to the 1st embodiment in FIG. 1A.

FIG. 1A shows one exploded view of a lens driving apparatus 10 according to a 1st embodiment of the present disclosure. FIG. 1B shows another exploded view of the lens driving apparatus 10 according to the 1st embodiment in FIG. 1A. FIG. 1C shows an assembling schematic view of an object side of the lens driving apparatus 10 according to the 1st embodiment in FIG. 1A. FIG. 1D shows an assembling schematic view of an image side of the lens driving apparatus 10 according to the 1st embodiment in FIG. 1A. According to FIGS. 1A-1D, the lens driving apparatus 10, in order from the object side to the image side, includes a cover 110, at least one metal conductive element 120, an imaging lens assembly (reference number is omitted), a carrier element 140, a driving mechanism 150 and a leaf spring element 160.

According to the 1st embodiment, a number of the metal conductive element 120 is two, which are symmetrically arranged, but the present disclosure will not be limited thereto. The metal conductive elements 120 are directly contacted with the carrier element 140, and the metal conductive elements 120 are located at one of an object side and an image side of the carrier element 140. According to the 1st embodiment, the metal conductive elements 120 are located at the object side of the carrier element 140, but the present disclosure will not be limited thereto. Specifically, each of the metal conductive elements 120 can be a cushioning member, and the metal conductive elements 120 can buffer the temperature gradient and pressure impacts applied to the carrier element 140 during assembling processes, thus increasing the manufacturing yield rate.

Moreover, each of the metal conductive elements 120 includes at least two positioning holes 121, which are coupled with the carrier element 140. Specifically, the metal conductive elements 120 can absorb the impact energy generated during assembling processes of the lens driving apparatus 10, so as to ensure the resolution of the imaging lens assembly would not be affected. With a number of at least two positioning holes 121, the self-rotation of the metal conductive elements 120 can be limited so as to improve the assembling efficiency. Therefore, a margin for automatic assembling steps can be provided by the metal conductive elements 120, and the mechanical assembling processes and electric welding processes can be separately controlled so as to reduce producing costs. Specifically, according to the 1st embodiment, each of the metal conductive elements 120 includes three positioning holes 121, but the present disclosure will not be limited thereto.

Figure 1E:
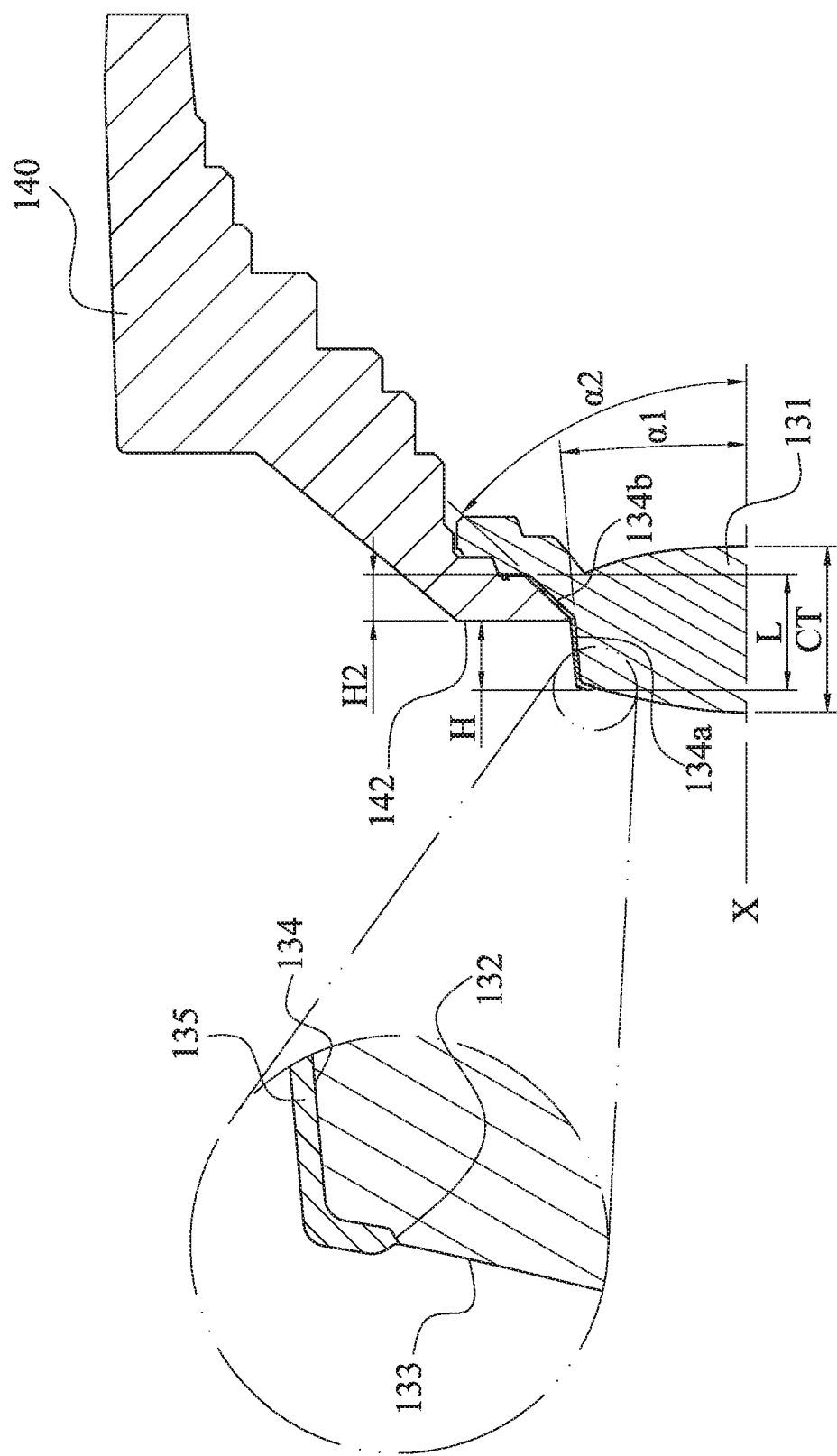
FIG. 1E is a partial schematic view of an imaging lens assembly and a carrier element according to the 1st embodiment in FIG. 1A.

FIG. 1E shows a partial schematic view of the imaging lens assembly and the carrier element 140 according to the 1st embodiment in FIG. 1A. In FIGS. 1A, 1B and 1E, the imaging lens assembly has an optical axis X and includes at least one plastic lens element 131, an annular step structure 132, a lens element 136 and a retainer 137. There is no additional one or more lens elements between the plastic lens element 131 and an imaged object (not shown). The plastic lens element 131, in order from a central region to a peripheral region, includes an effective optical portion 133, a peripheral portion 134 and a light-shielding layer 135. The optical axis X of the imaging lens assembly passes through the effective optical portion 133. The peripheral portion 134 surrounds the effective optical portion 133. The light-shielding layer 135 is disposed on an object side of the peripheral portion 134 of the plastic lens element 131 and surrounds the effective optical portion 133. Specifically, the light-shielding layer 135 is originally liquid and is opaque with an adhesion after curing. The light-shielding layer 135 can be a retaining element and can be used to control an amount of an incident light, so as to determine a bundle of the incident light. The annular step structure 132 surrounds the effective optical portion 133 in a full-circle form, and the annular step structure 132 is connected with the effective optical portion 133 and the peripheral portion 134. Specifically, the full-circle form refers to a situation in which the annular step structure 132 surrounds the effective optical portion 133 without disconnection. With the annular step structure 132 in the full-circle form, it is favorable for element demolding so as to improve the flatness of the bearing surface.

In FIG. 1A and FIG. 1B, the lens element 136 is disposed at an image side of the plastic lens element 131, and the retainer 137 is disposed at an image side of the lens element 136. The optical characteristics of the lens element and the retainer, such as numbers, structures and surface shapes can be configured according to different imaging requirements, and other optical elements can be arranged according to requirements, the present disclosure will not be limited thereto.

Specifically, a part of the light-shielding layer 135 does not overlap with the carrier element 140 in a direction perpendicular to the optical axis X, which can be refer to as the light-shielding layer 135 is exposed to the air, or the aforementioned part of the light-shielding layer 135 is located at the object side of the carrier element 140, but the present disclosure will not be limited thereto. Therefore, the light-shielding layer 135 can be adaptively filled into a special spatial configuration between the optical elements so as to be accumulated at an ideal light-shielding position, thus improving the performance of shielding stray light. Moreover, it is favorable for miniaturization of the imaging lens assembly by designing the light-shielding layer 135 as a light entrance.

Further, a part of the light-shielding layer 135 is coated on the annular step structure 132. Specifically, the annular step structure 132 can accumulate the light-shielding layer 135, so that the optical density of a part of the annular step structure 132 can be increased. Therefore, the image recognition error caused by coating the light-shielding layer 135 can be reduced, and the efficiency of automatic production can be improved.

The peripheral portion 134 of the plastic lens element 131 can further include at least one outer tilting surface. Specifically, according to the 1st embodiment, a number of the outer tilting surface can be N, and N is two. Each of the two outer tilting surfaces is an outer tilting surface 134a and an outer tilting surface 134b, respectively. A part of the light-shielding layer 135 is coated on the outer tilting surfaces 134a, 134b. The design of the outer tilting surfaces 134a, 134b is favorable for mold releasing and element demolding, and can also provide an accumulating space for coating the light-shielding layer 135. Hence, the outer tilting surfaces 134a, 134b allow the plastic lens element 131 to be moved further towards the object side, and it is favorable for achieving miniaturization of the imaging lens assembly.

Figure 1F:
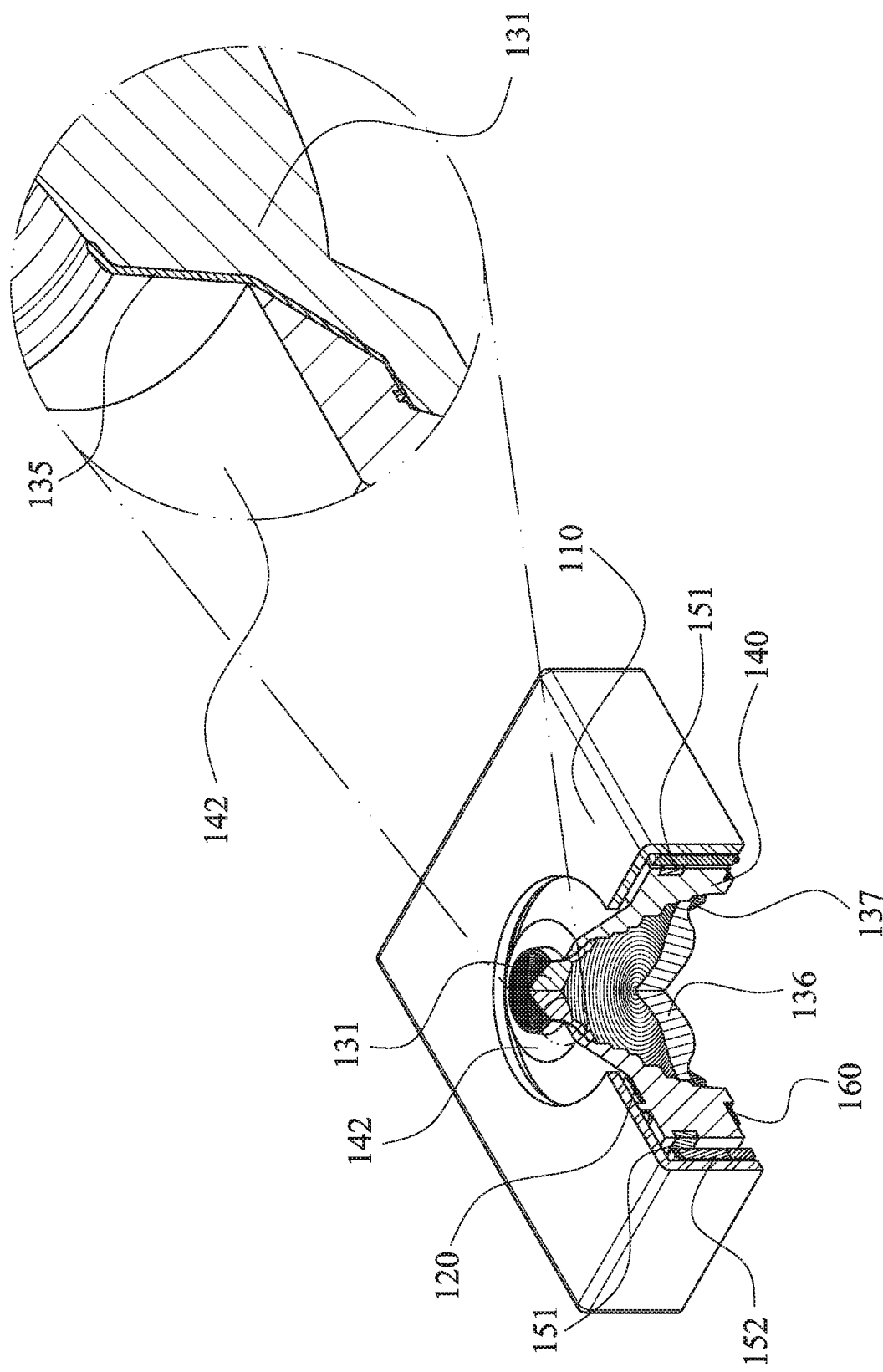
FIG. 1F is a partial sectional view of the object side of the lens driving apparatus according to the 1st embodiment in FIG. 1A.

FIG. 1F shows a partial sectional view of the object side of the lens driving apparatus 10 according to the 1st embodiment in FIG. 1A. FIG. 1G shows a partial sectional view of the image side of the lens driving apparatus 10 according to the 1st embodiment in FIG. 1A. According to FIGS. 1A, 1B, 1F and 1G, the driving mechanism 150 includes at least one coil and at least one magnet. According to the 1st embodiment, the driving mechanism 150 includes a coil 151 and two magnets 152, but the present disclosure will not be limited thereto. The magnets 152 are disposed correspondingly with the coil 151. A driving magnetic force is generated by an interaction between the coil 151 and the magnets 152, so that the imaging lens assembly can be driven to move along a direction parallel to the optical axis X by the driving mechanism 150. Specifically, the driving magnetic force generated by the interaction between the coil 151 and the magnets 152 can be an electromagnetic driving force, and the driving magnetic force refers to the Lorentz force generated by an electromagnetic interaction.

The carrier element 140 is for configuring the imaging lens assembly and one of the coil 151 and the magnets 152 of the driving mechanism 150, and both of the plastic lens element 131 and one of the coil 151 and the magnets 152 of the driving mechanism 150 are directly contacted with the carrier element 140. An outer surface of the carrier element 140 further includes an assembling structure 141, which is directly contacted with one of the coil 151 and the magnets 152 of the driving mechanism 150, and is for arranging the coil 151 and the magnets 152 to face towards each other. The assembling structure 141 and the carrier element 140 are made integrally. Specifically, according to the 1st embodiment, the carrier element 140 is for configuring the imaging lens assembly and the coil 151 of the driving mechanism 150, and the assembling structure 141 is directly contacted with the coil 151 of the driving mechanism 150.

Furthermore, the carrier element 140 further includes a top surface 142, the top surface 142 is extended along the direction perpendicular to the optical axis X and face towards the object side of the lens driving apparatus 10. Specifically, the carrier element 140 is configured with both of the imaging lens assembly and the driving mechanism 150 simultaneously, so that the functions of the conventional lens barrel and carrier are integrated for reducing producing costs. By configuring both of the imaging lens assembly and the driving mechanism 150 with the carrier element 140, assembling processes can be simplified and the manufacturing yield rate can be increased.

Specifically, the appearance of one side of the carrier element 140 towards the image side of the lens driving apparatus 10 can be a polygon. Therefore, the connecting structure of the sensor can be matched, and the convenience of element extraction in automatic producing processes can be improved. The polygon can be rectangular-shaped, and the polygon being rectangular-shaped has a plurality of chamfered corners 143. Moreover, the polygon can also be a hexagon or an octagon, but the present disclosure will not be limited thereto. Therefore, the spatial utilization efficiency of the space inside the lens driving apparatus 10 can be increased. Further, at least two gate traces are disposed at the chamfered corners 143, respectively. Moreover, a number of the gate traces can be at least three, but the injecting position will not be limited thereto. According to the 1st embodiment, the number of the gate traces 144 is three. Thus, a high molding quality can be maintained, and the carrier element 140 with more complicated structures can be molded.

The leaf spring element 160 is assembled with the carrier element 140 and is located at the image side of the carrier element 140. Therefore, a suitable mechanical supporting structure and an ideal driving stroke configuration can be designed within a limited space by using the material characteristics.

In FIG. 1E, when the extending distance of the light-shielding layer 135 from the top surface 142 towards the object side of the lens driving apparatus 10 along the direction parallel to the optical axis X is H, the central thickness of the plastic lens element 131 is CT, the length of the light-shielding layer 135 along the direction parallel to the optical axis X is L, the extending distance of the light-shielding layer 135 from the top surface 142 towards the image side of the lens driving apparatus 10 along the direction parallel to the optical axis X is H2, the angle between the outer tilting surface 134a and the optical axis X is α1, and the angle between the outer tilting surface 134b and the optical axis X is α2, the conditions of the following Table 1 are satisfied. Specifically, a direction of the top surface 142 towards the object side is defined as positive, a direction of the top surface 142 towards the image side is defined as negative, the top surface 142 is perpendicular to the optical axis X, and the intersection of an extension line of the top surface 142 and the optical axis X is a zero point.

TABLE 1

| the 1st embodiment | | | |
|---|---|---|---|
| H (mm) | 0.37 | H2/CT | −0.28 |
| CT (mm) | 0.89 | L (mm) | 0.62 |
| H/CT | 0.42 | α1(degree) | 5 |
| H2 (mm) | −0.25 | α2(degree) | 47.6 |

<2nd embodiment>

2nd Embodiment

Figure 2A:
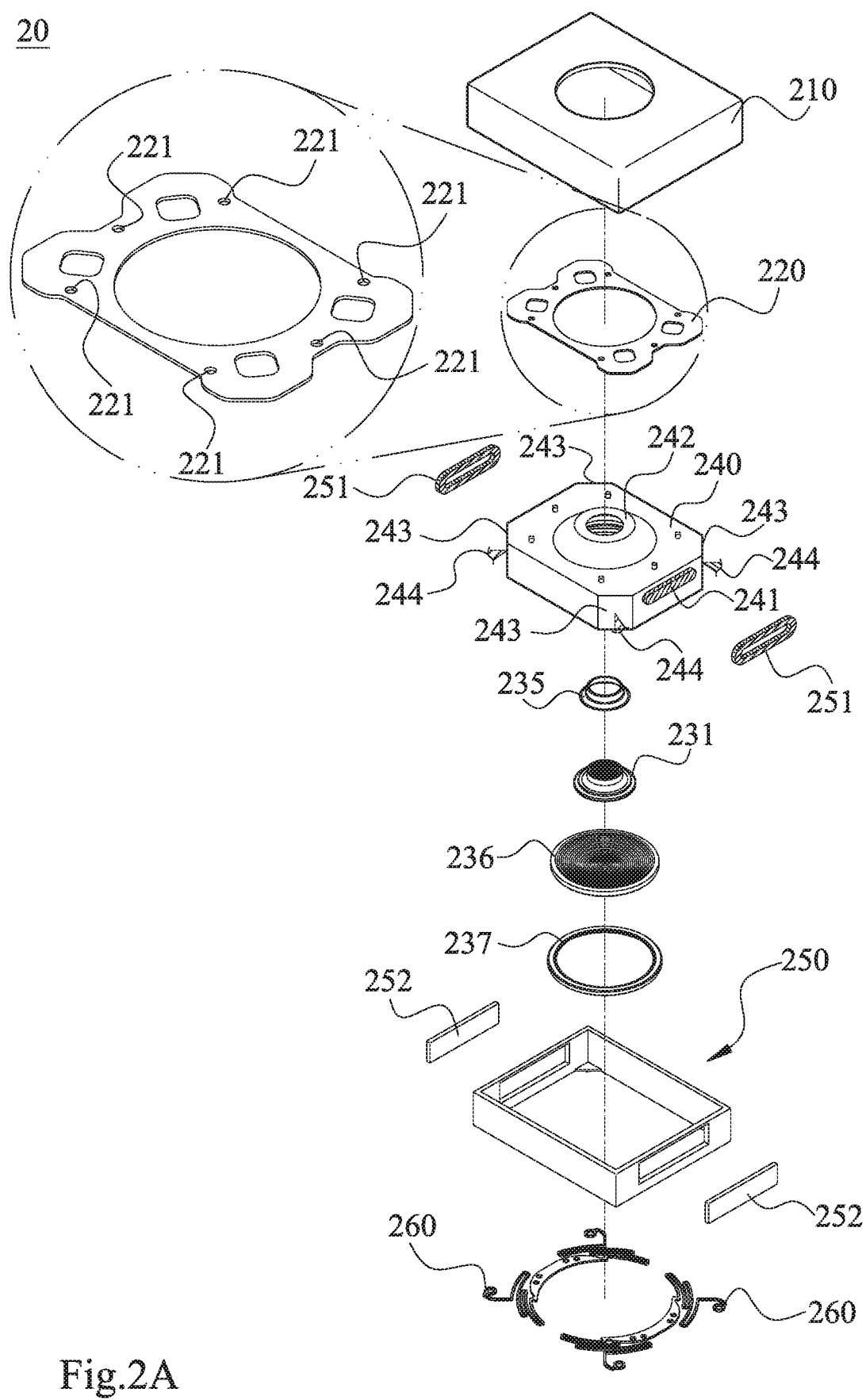
FIG. 2A is one exploded view of a lens driving apparatus according to a 2nd embodiment of the present disclosure.
Figure 2B:
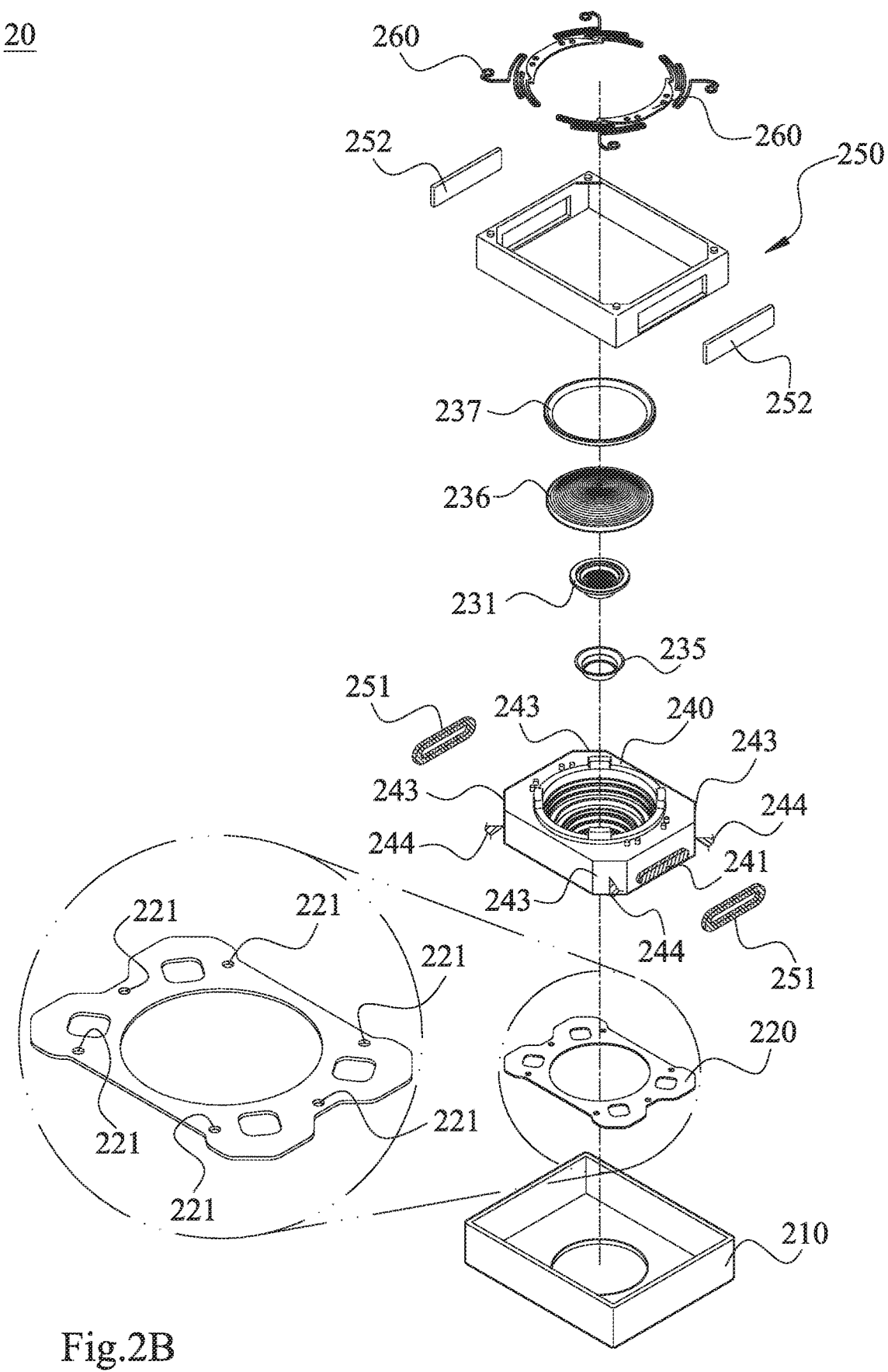
FIG. 2B is another exploded view of the lens driving apparatus according to the 2nd embodiment in FIG. 2A.
Figure 2C:
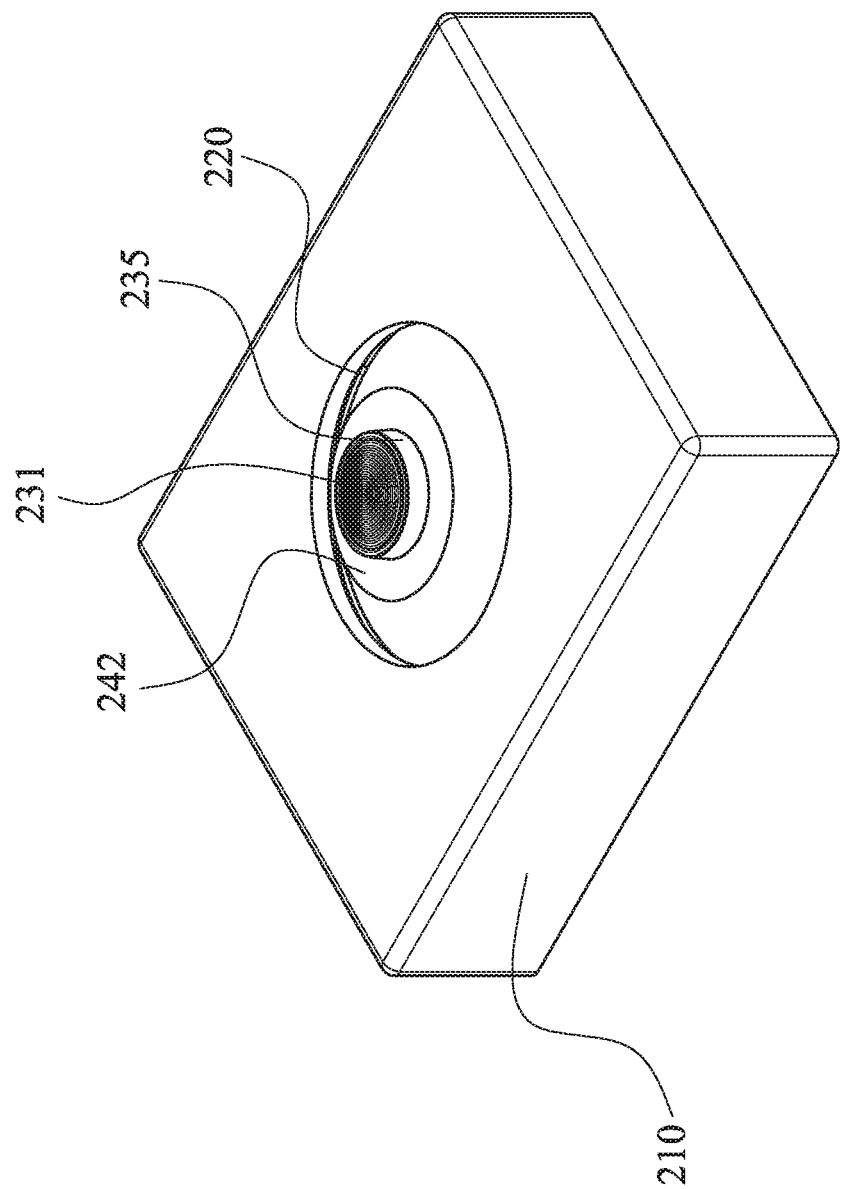
FIG. 2C is an assembling schematic view of an object side of the lens driving apparatus according to the 2nd embodiment in FIG. 2A.
Figure 2D:
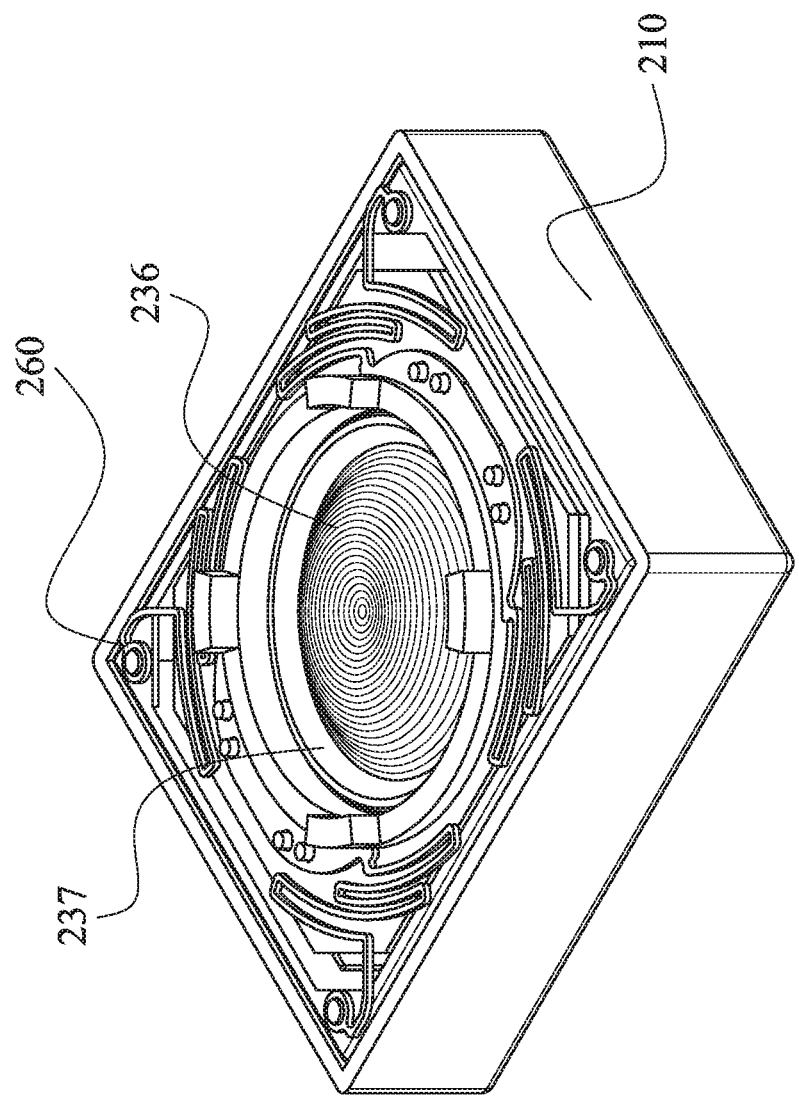
FIG. 2D is an assembling schematic view of an image side of the lens driving apparatus according to the 2nd embodiment in FIG. 2A.

FIG. 2A shows one exploded view of a lens driving apparatus 20 according to a 2nd embodiment of the present disclosure. FIG. 2B shows another exploded view of the lens driving apparatus 20 according to the 2nd embodiment in FIG. 2A. FIG. 2C shows an assembling schematic view of an object side of the lens driving apparatus 20 according to the 2nd embodiment in FIG. 2A. FIG. 2D shows an assembling schematic view of an image side of the lens driving apparatus 20 according to the 2nd embodiment in FIG. 2A. According to FIGS. 2A-2D, the lens driving apparatus 20, in order from the object side to the image side, includes a cover 210, at least one metal conductive element 220, an imaging lens assembly (reference number is omitted), a carrier element 240, a driving mechanism 250 and a leaf spring element 260.

According to the 2nd embodiment, a number of the metal conductive element 220 is one, but the present disclosure will not be limited thereto. The metal conductive element 220 is directly contacted with the carrier element 240, and the metal conductive element 220 is located at one of an object side and an image side of the carrier element 240. According to the 2nd embodiment, the metal conductive element 220 is located at the object side of the carrier element 240, but the present disclosure will not be limited thereto. Specifically, the metal conductive element 220 can be a cushioning member, and the metal conductive element 220 can buffer the temperature gradient and pressure impacts applied to the carrier element 240 during assembling processes, thus increasing the manufacturing yield rate.

Moreover, the metal conductive element 220 includes at least two positioning holes 221, which are coupling with the carrier element 240. Specifically, the metal conductive element 220 can absorb the impact energy generated during assembling processes of the lens driving apparatus 20, so as to ensure the resolution of the imaging lens assembly would not be affected. With a number of at least two positioning holes 221, the self-rotation of the metal conductive element 220 can be limited so as to improve the assembling efficiency. Therefore, a margin for automatic assembling steps can be provided by the metal conductive element 220, and the mechanical assembling processes and electric welding processes can be separately controlled so as to reduce producing costs. Specifically, according to the 2nd embodiment, the number of the positioning holes 221 is six, but the present disclosure will not be limited thereto.

Figure 2E:
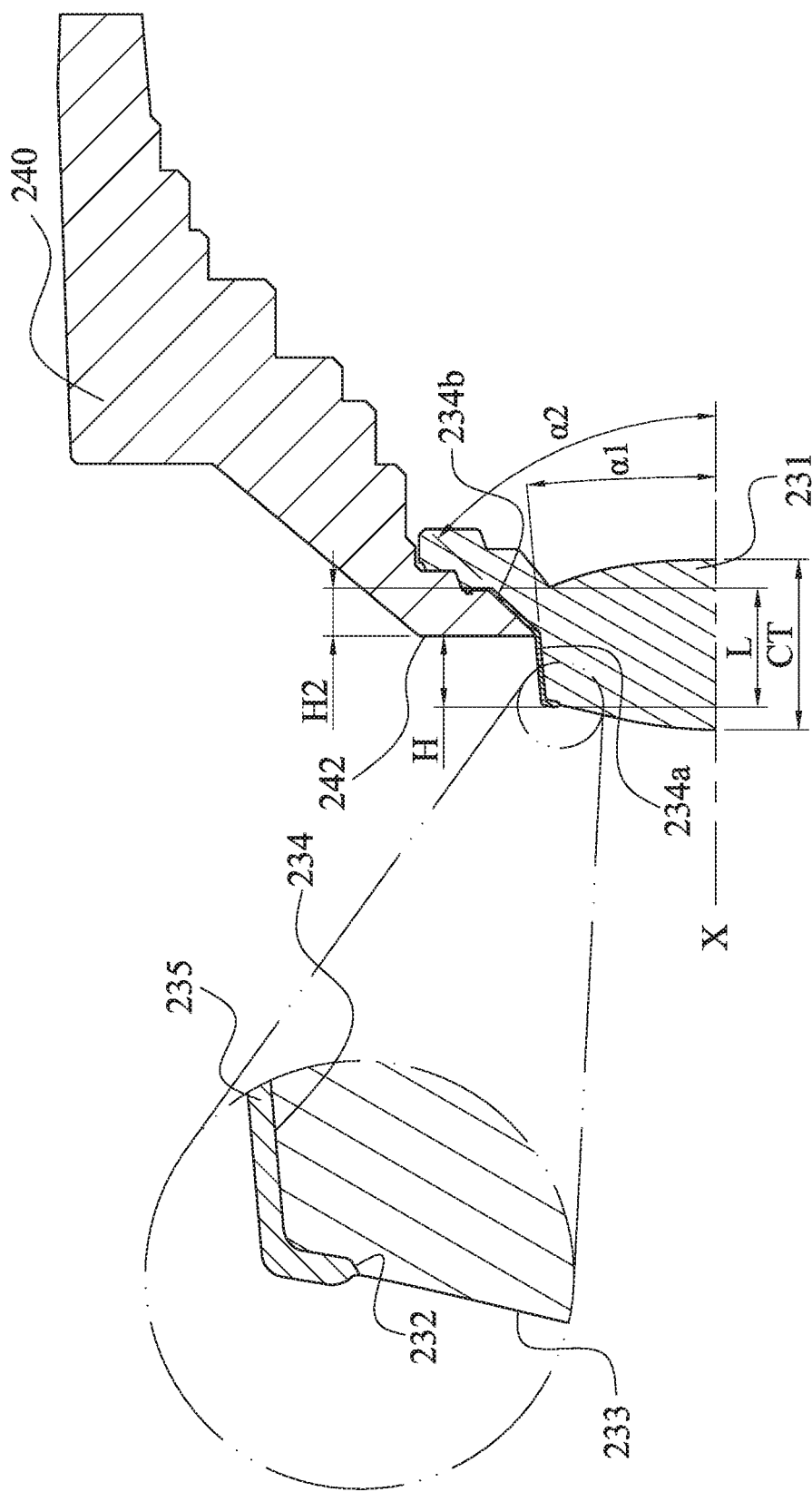
FIG. 2E is a partial schematic view of an imaging lens assembly and a carrier element according to the 2nd embodiment in FIG. 2A.

FIG. 2E shows a partial schematic view of the imaging lens assembly and the carrier element 240 according to the 2nd embodiment in FIG. 2A. In FIGS. 2A, 2B and 2E, the imaging lens assembly has an optical axis X and includes at least one plastic lens element 231, an annular step structure 232, a lens element 236 and a retainer 237. There is no additional one or more lens elements between the plastic lens element 231 and an imaged object (not shown). The plastic lens element 231, in order from a central region to a peripheral region, includes an effective optical portion 233, a peripheral portion 234 and a light-shielding layer 235. The optical axis X of the imaging lens assembly passes through the effective optical portion 233. The peripheral portion 234 surrounds the effective optical portion 233. The light-shielding layer 235 is disposed on an object side of the peripheral portion 234 of the plastic lens element 231 and surrounds the effective optical portion 233. Specifically, the light-shielding layer 235 is originally liquid and is opaque with an adhesion after curing. The light-shielding layer 235 can be a retaining element and can be used to control an amount of an incident light, so as to determine a bundle of the incident light. The annular step structure 232 surrounds the effective optical portion 233 in a full-circle form, and the annular step structure 232 is connected with the effective optical portion 233 and the peripheral portion 234. Specifically, the full-circle form refers to a situation in which the annular step structure 232 surrounds the effective optical portion 233 without disconnection. With the annular step structure 232 in the full-circle form, it is favorable for element demolding so as to improve the flatness of the bearing surface.

In FIG. 2A and FIG. 2B, the lens element 236 is disposed at an image side of the plastic lens element 231, and the retainer 237 is disposed at the image side of the lens element 236. The optical characteristics of the lens element and the retainer, such as numbers, structures and lens surface shapes can be configured according to different imaging requirements, and other optical elements can be arranged according to requirements, the present disclosure will not be limited thereto.

Specifically, a part of the light-shielding layer 235 does not overlap with the carrier element 240 in a direction perpendicular to the optical axis X, which can be refer to as the light-shielding layer 235 is exposed to the air, or the aforementioned part of the light-shielding layer 235 is located at the object side of the carrier element 240, but the present disclosure will not be limited thereto. Therefore, the light-shielding layer 235 can be adaptively filled into a special spatial configuration between the optical elements so as to be accumulated at an ideal light-shielding position, thus improving the performance of shielding stray light. Moreover, it is favorable for miniaturization of the imaging lens assembly by designing the light-shielding layer 235 as a light entrance.

Further, a part of the light-shielding layer 235 is coated on the annular step structure 232. Specifically, the annular step structure 232 can accumulate the light-shielding layer 235, so that the optical density of a part of the annular step structure 232 can be increased. Therefore, the image recognition error caused by coating the light-shielding layer 235 can be reduced, and the efficiency of automatic production can be improved.

The peripheral portion 234 of the plastic lens element 231 can further include at least one outer tilting surface. Specifically, according to the 2nd embodiment, a number of the outer tilting surface can be N, and N is two. Each of the two outer tilting surfaces is an outer tilting surface 234a and an outer tilting surface 234b, respectively. A part of the light-shielding layer 235 is coated on the outer tilting surfaces 234a, 234b. The design of the outer tilting surfaces 234a, 234b is favorable for mold releasing and element demolding, and can also provide an accumulating space for coating the light-shielding layer 235. Hence, the outer tilting surfaces 234a, 234b allow the plastic lens element 231 to be moved further towards the object side, and it is favorable for achieving miniaturization of the imaging lens assembly.

Figure 2F:
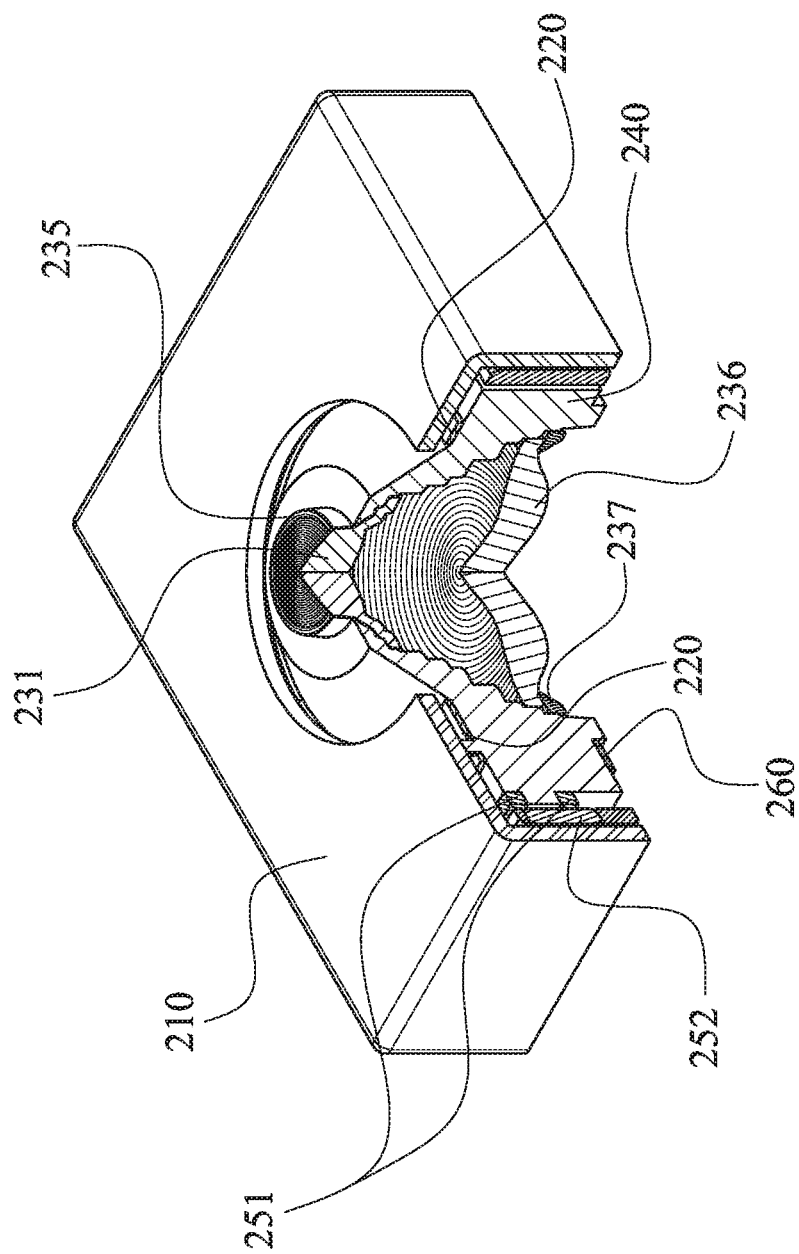
FIG. 2F is a partial sectional view of the object side of the lens driving apparatus according to the 2nd embodiment in FIG. 2A.
Figure 2G:
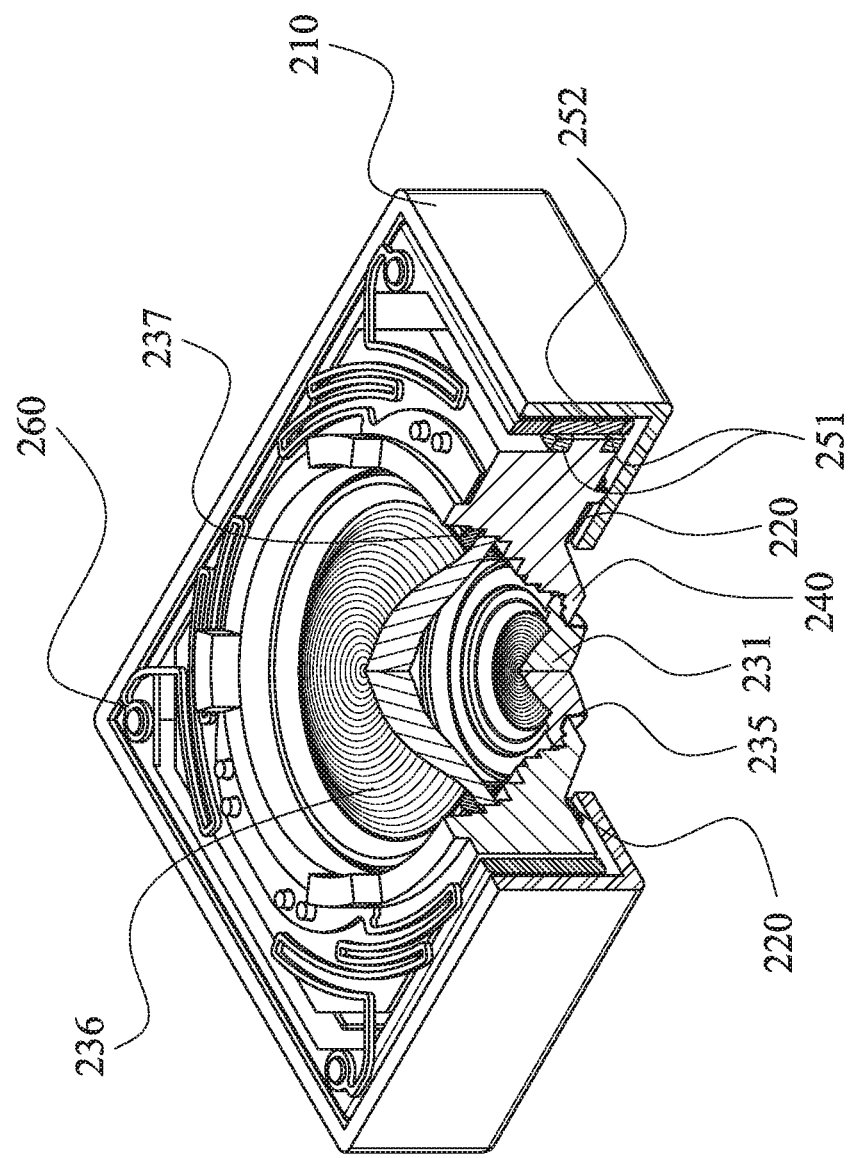
FIG. 2G is a partial sectional view of the image side of the lens driving apparatus according to the 2nd embodiment in FIG. 2A.

FIG. 2F shows a partial sectional view of the object side of the lens driving apparatus 20 according to the 2nd embodiment in FIG. 2A. FIG. 2G shows a partial sectional view of the image side of the lens driving apparatus 20 according to the 2nd embodiment in FIG. 2A. In FIGS. 2A, 2B, 2F and 2G, the driving mechanism 250 includes at least one coil and at least one magnet, and a number of the coil can be at least two. According to the 2nd embodiment, the driving mechanism 250 includes two coils 251 and two magnets 252, but the present disclosure will not be limited thereto. The magnets 252 are disposed correspondingly with the coils 251. A driving magnetic force is generated by an interaction between the coils 251 and the magnets 252, so that the imaging lens assembly can be driven to move along a direction parallel to the optical axis X by the driving mechanism 250. Specifically, the driving magnetic force generated by the interaction between the coils 251 and the magnets 252 can be an electromagnetic driving force, and the driving magnetic force refers to the Lorentz force generated by an electromagnetic interaction.

The carrier element 240 is for configuring the imaging lens assembly and one of the coils 251 and the magnets 252 of the driving mechanism 250, and both of the plastic lens element 231 and one of the coils 251 and the magnets 252 of the driving mechanism 250 are directly contacted with the carrier element 240. An outer surface of the carrier element 240 further includes an assembling structure 241, which is directly contacted with one of the coils 251 and the magnets 252 of the driving mechanism 250, and is for arranging the coils 251 and the magnets 252 to face towards each other. The assembling structure 241 and the carrier element 240 are made integrally. Specifically, according to the 2nd embodiment, the carrier element 240 is for configuring the imaging lens assembly and the coils 251 of the driving mechanism 250, and the assembling structure 241 is directly contacted with the coils 251 of the driving mechanism 250.

Moreover, the carrier element 240 further includes a top surface 242, the top surface 242 is extended along the direction perpendicular to the optical axis X and faces towards an object side of the lens driving apparatus 20. Specifically, the carrier element 240 is configured with both of the imaging lens assembly and the driving mechanism 250 simultaneously, so that the functions of the conventional lens barrel and carrier are integrated for reducing producing costs. By configuring both of the imaging lens assembly and the driving mechanism 250 with the carrier element 240, assembling processes can be simplified and the manufacturing yield rate can be increased.

Specifically, the appearance of one side of the carrier element 240 towards the image side of the lens driving apparatus 20 can be a polygon. Therefore, the connecting structure of the sensor can be matched, and the convenience of element extraction in automatic producing processes can be improved. The polygon can be rectangular-shaped, and the polygon being rectangular-shaped has a plurality of chamfered corners 243. Moreover, the polygon can also be a hexagon or an octagon, but the present disclosure will not be limited thereto. Therefore, the spatial utilization efficiency of the space inside the lens driving apparatus 20 can be increased. Further, at least two gate traces are disposed at the chamfered corners 243 respectively. Moreover, a number of the gate traces can be at least three, but the injecting position will not be limited thereto. According to the 2nd embodiment, the number of the gate traces 244 is three. Thus, a high molding quality can be maintained, and the carrier element 240 with more complicated structures can be molded.

Furthermore, the coils 251 are correspondingly disposed along the optical axis X of the imaging lens assembly, and are disposed on two sides of the polygon being rectangular-shaped which are correspondingly disposed. Therefore, the Lorentz force generated by the electromagnetic interaction can be increased so as to promote the driving efficiency.

The leaf spring element 260 is assembled with the carrier element 240 and is located at the image side of the carrier element 240. Therefore, a suitable mechanical supporting structure and an ideal driving stroke configuration can be designed within a limited space by using the material characteristics.

In FIG. 2E, when the extending distance of the light-shielding layer 235 from the top surface 242 towards the object side of the lens driving apparatus 20 along the direction parallel to the optical axis X is H, the central thickness of the plastic lens element 231 is CT, the length of the light-shielding layer 235 along the direction parallel to the optical axis X is L, the extending distance of the light-shielding layer 235 from the top surface 242 towards the image side of the lens driving apparatus 20 along the direction parallel to the optical axis X is H2, the angle between the outer tilting surface 234a and the optical axis X is α1, and the angle between the outer tilting surface 234b and the optical axis X is α2, the conditions of the following Table 2 are satisfied. Specifically, a direction of the top surface 242 towards the object side is defined as positive, a direction of the top surface 242 towards the image side is defined as negative, the top surface 242 is perpendicular to the optical axis X, and the intersection of an extension line of the top surface 242 and the optical axis X is a zero point.

TABLE 2

| the 2nd embodiment | | | |
|---|---|---|---|
| H (mm) | 0.37 | H2/CT | −0.28 |
| CT (mm) | 0.89 | L (mm) | 0.62 |
| H/CT | 0.42 | α1 (degree) | 5 |
| H2 (mm) | −0.25 | α2 (degree) | 47.6 |

<3rd embodiment>

3rd Embodiment

Figure 3A:
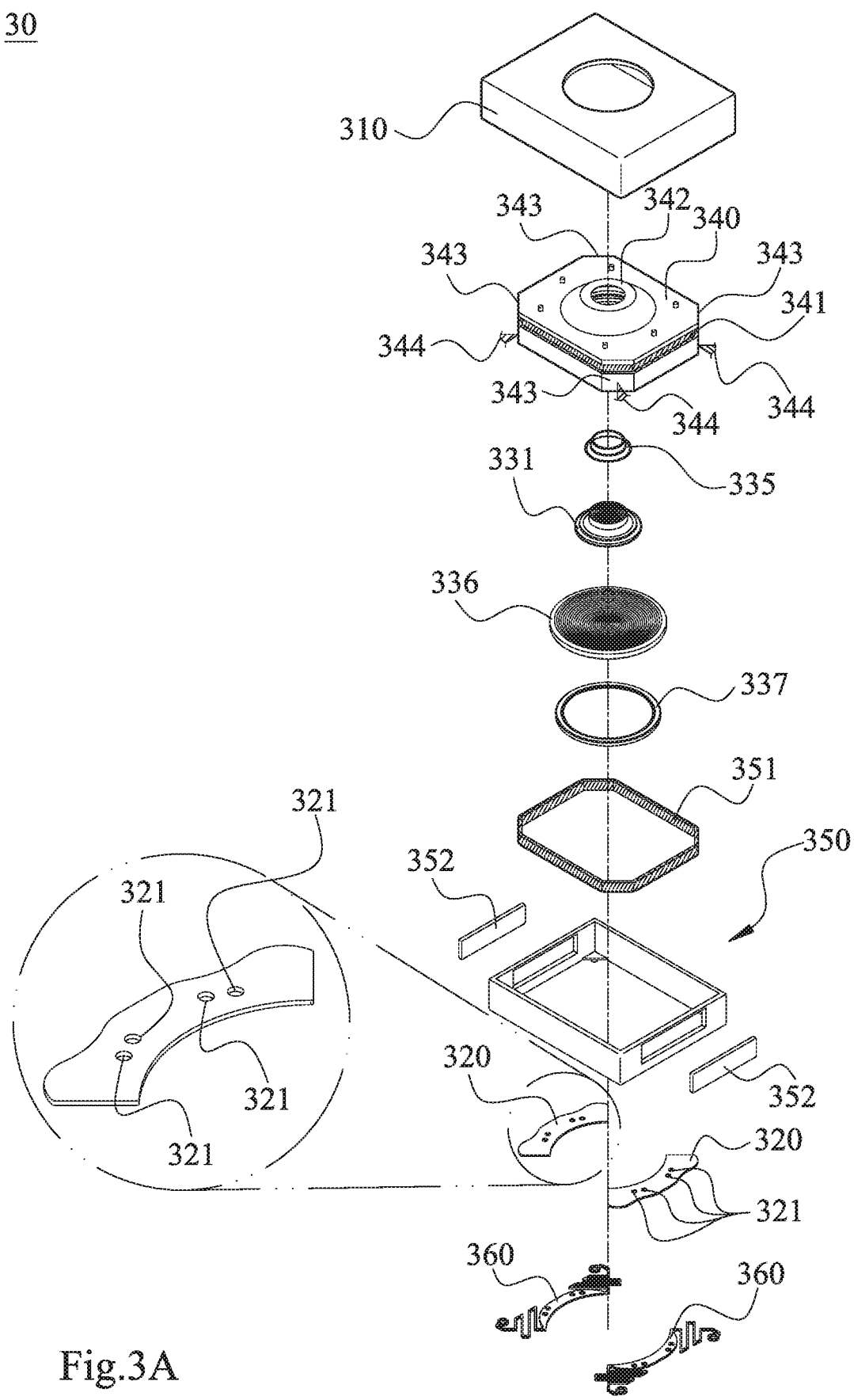
FIG. 3A is one exploded view of a lens driving apparatus according to a 3rd embodiment of the present disclosure.
Figure 3B:
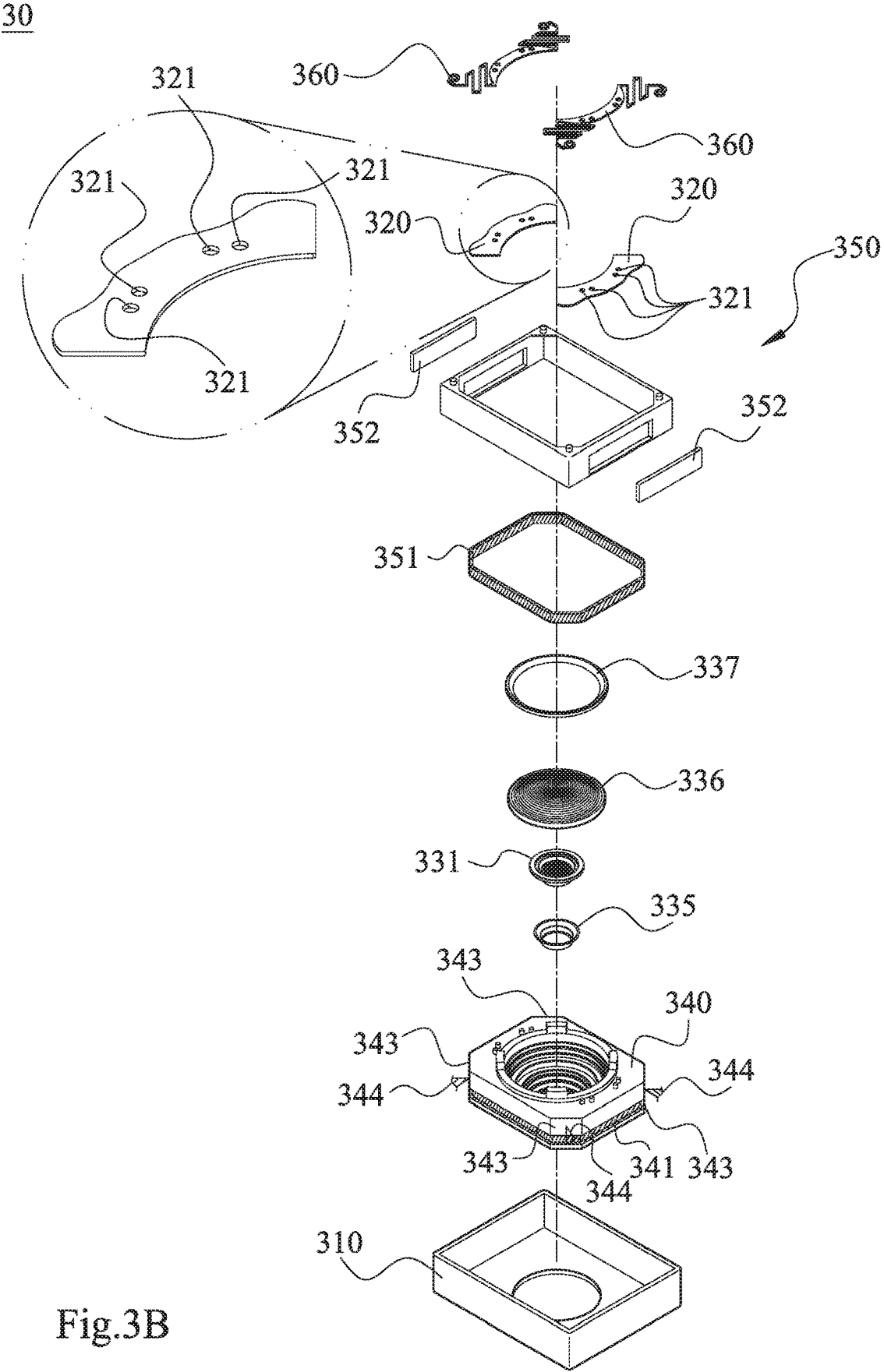
FIG. 3B is another exploded view of the lens driving apparatus according to the 3rd embodiment in FIG. 3A.
Figure 3C:
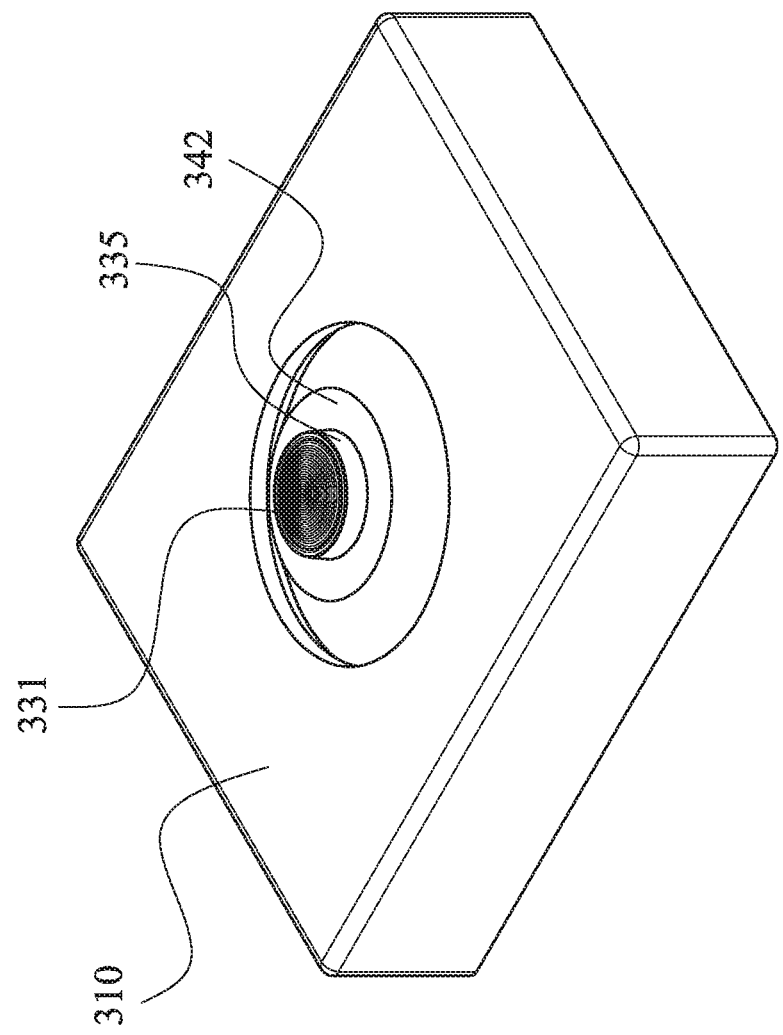
FIG. 3C is an assembling schematic view of an object side of the lens driving apparatus according to the 3rd embodiment in FIG. 3A.
Figure 3D:
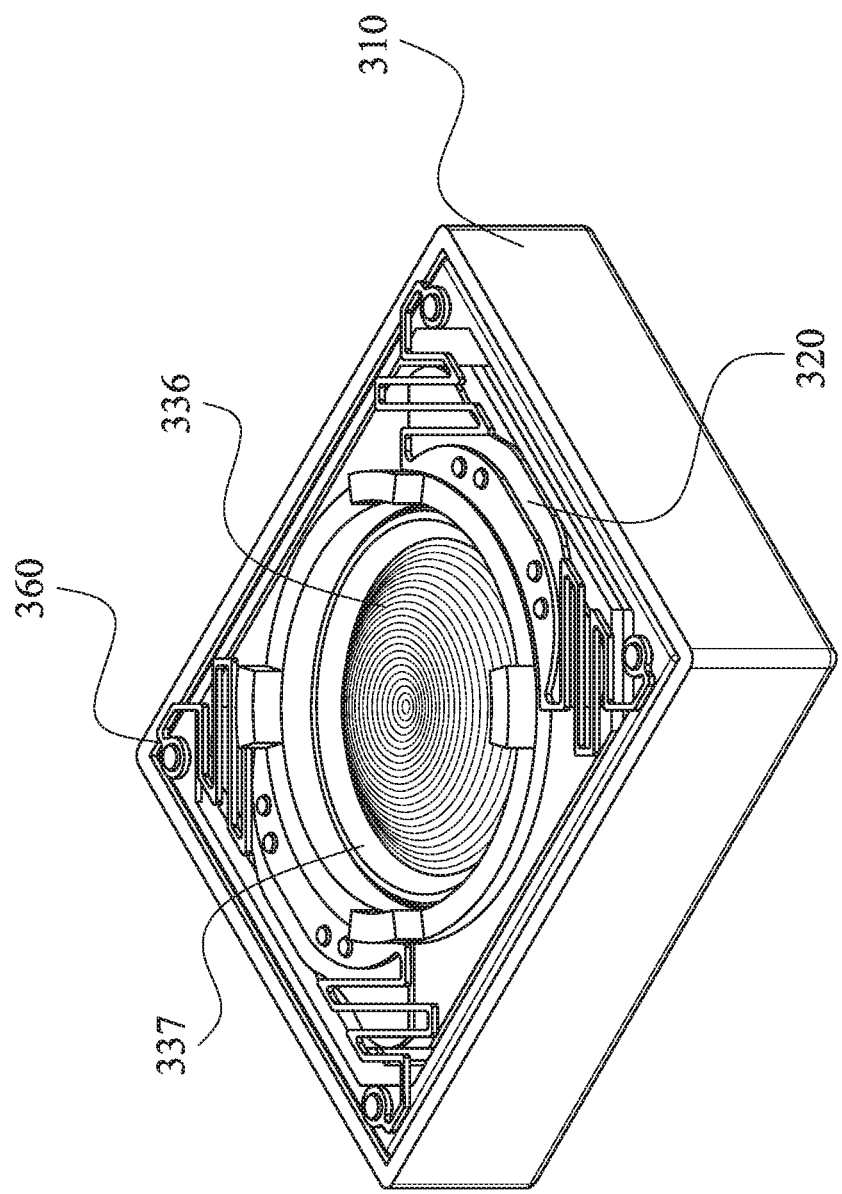
FIG. 3D is an assembling schematic view of an image side of the lens driving apparatus according to the 3rd embodiment in FIG. 3A.

FIG. 3A shows one exploded view of a lens driving apparatus 30 according to a 3rd embodiment of the present disclosure. FIG. 3B shows another exploded view of the lens driving apparatus 30 according to the 3rd embodiment in FIG. 3A. FIG. 3C shows an assembling schematic view of an object side of the lens driving apparatus 30 according to the 3rd embodiment in FIG. 3A. FIG. 3D shows an assembling schematic view of an image side of the lens driving apparatus 30 according to the 3rd embodiment in FIG. 3A. According to FIGS. 3A-3D, the lens driving apparatus 30, in order from the object side to the image side, includes a cover 310, an imaging lens assembly (reference number is omitted), a carrier element 340, a driving mechanism 350, at least one metal conductive element 320 and a leaf spring element 360.

According to the 3rd embodiment, a number of the metal conductive element 320 is two, which are symmetrically arranged, but the present disclosure will not be limited thereto. The metal conductive elements 320 are directly contacted with the carrier element 340, and the metal conductive elements 320 are located at one of an object side and an image side of the carrier element 340. According to the 3rd embodiment, the metal conductive elements 320 are located at the image side of the carrier element 340, but the present disclosure will not be limited thereto. Specifically, each of the metal conductive elements 320 can be a cushioning member, and the metal conductive elements 320 can buffer the temperature gradient and pressure impacts applied to the carrier element 340 during assembling processes, thus increasing the manufacturing yield rate.

Moreover, each of the metal conductive elements 320 includes at least two positioning holes 321, which are coupling with the carrier element 340. Specifically, the metal conductive elements 320 can absorb the impact energy generated during assembling processes of the lens driving apparatus 30, so as to ensure the resolution of the imaging lens assembly would not be affected. With a number of at least two positioning holes 321, the self-rotation of the metal conductive elements 320 can be limited so as to improve the assembling efficiency. Therefore, a margin for automatic assembling steps can be provided by the metal conductive elements 320, and the mechanical assembling processes and electric welding processes can be separately controlled so as to reduce producing costs. Specifically, according to the 3rd embodiment, each of the metal conductive elements 320 includes four positioning holes 321, but the present disclosure will not be limited thereto.

Figure 3E:
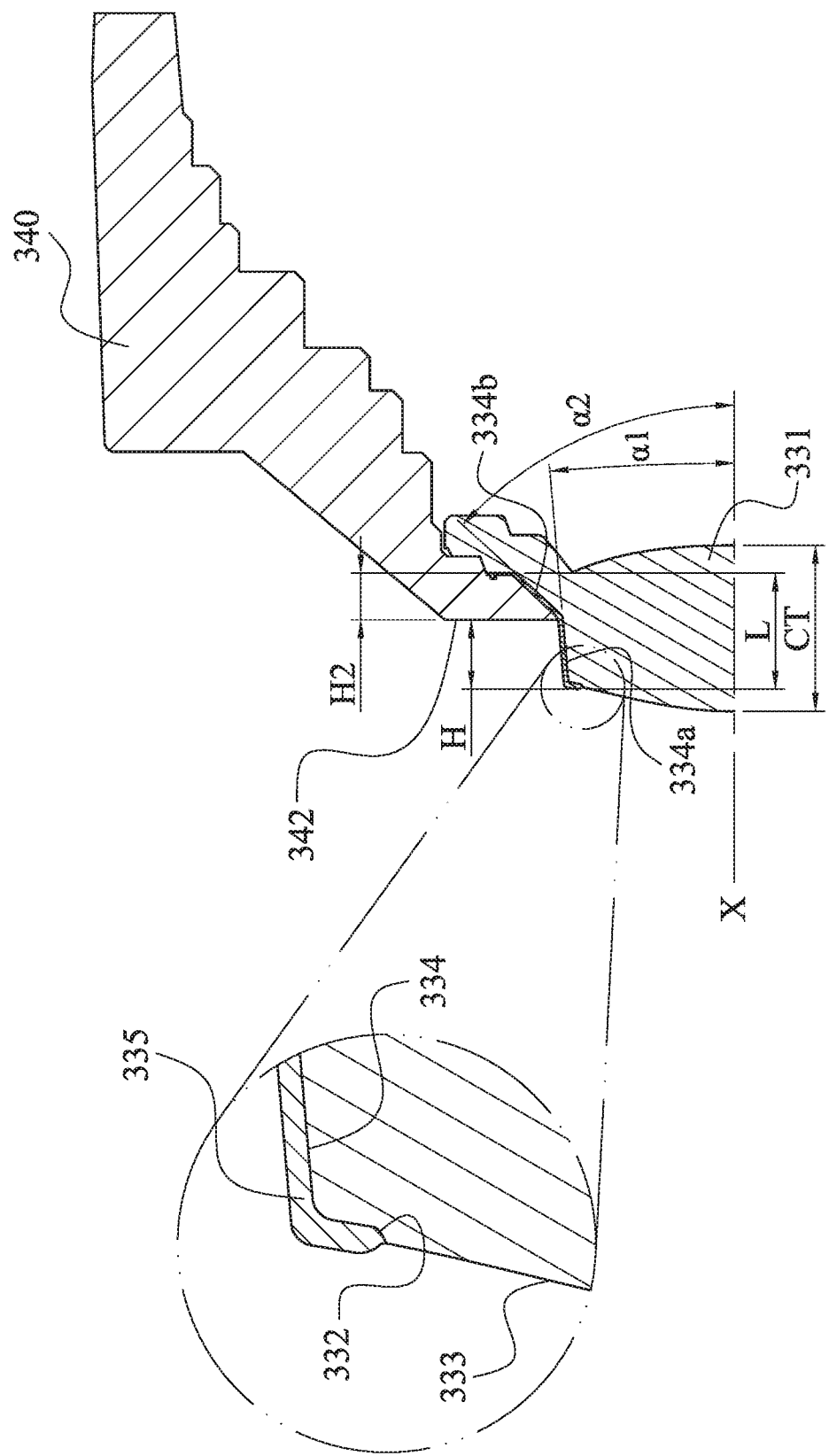
FIG. 3E is a partial schematic view of an imaging lens assembly and a carrier element according to the 3rd embodiment in FIG. 3A.

FIG. 3E shows a partial schematic view of the imaging lens assembly and the carrier element 340 according to the 3rd embodiment in FIG. 3A. In FIGS. 3A, 3B and 3E, the imaging lens assembly has an optical axis X and includes at least one plastic lens element 331, an annular step structure 332, a lens element 336 and a retainer 337. There is no additional one or more lens elements between the plastic lens element 331 and an imaged object (not shown). The plastic lens element 331, in order from a central region to a peripheral region, includes an effective optical portion 333, a peripheral portion 334 and a light-shielding layer 335. The optical axis X of the imaging lens assembly passes through the effective optical portion 333. The peripheral portion 334 surrounds the effective optical portion 333. The light-shielding layer 335 is disposed on an object side of the peripheral portion 334 of the plastic lens element 331 and surrounds the effective optical portion 333. Specifically, the light-shielding layer 335 is originally liquid and is opaque with an adhesion after curing. The light-shielding layer 335 can be a retaining element and can be used to control an amount of an incident light, so as to determine a bundle of the incident light. The annular step structure 332 surrounds the effective optical portion 333 in a full-circle form, and the annular step structure 332 is connected with the effective optical portion 333 and the peripheral portion 334. Specifically, the full-circle form refers to a situation in which the annular step structure 332 surrounds the effective optical portion 333 without disconnection. With the annular step structure 332 in the full-circle form, it is favorable for element demolding so as to improve the flatness of the bearing surface.

In FIG. 3A and FIG. 3B, the lens element 336 is disposed at an image side of the plastic lens element 331, and the retainer 337 is disposed at an image side of the lens element 336. The optical characteristics of the lens element and the retainer, such as numbers, structures and lens surface shapes can be configured according to different imaging requirements, and other optical elements can be arranged according to requirements, the present disclosure will not be limited thereto.

Specifically, a part of the light-shielding layer 335 does not overlap with the carrier element 340 in a direction perpendicular to the optical axis X, which can be refer to as the light-shielding layer 335 is exposed to the air, or the aforementioned part of the light-shielding layer 335 is located at the object side of the carrier element 340, but the present disclosure will not be limited thereto. Therefore, the light-shielding layer 335 can be adaptively filled into a special spatial configuration between the optical elements so as to be accumulated at an ideal light-shielding position, thus improving the performance of shielding stray light. Moreover, it is favorable for miniaturization of the imaging lens assembly by designing the light-shielding layer 335 as a light entrance.

Further, a part of the light-shielding layer 335 is coated on the annular step structure 332. Specifically, the annular step structure 332 can accumulate the light-shielding layer 335, so that the optical density of a part of the annular step structure 332 can be increased. Therefore, the image recognition error caused by coating the light-shielding layer 335 can be reduced, and the efficiency of automatic production can be improved.

The peripheral portion 334 of the plastic lens element 331 can further include at least one outer tilting surface. Specifically, according to the 3rd embodiment, a number of the outer tilting surface can be N, and N is two. Each of the two outer tilting surfaces is an outer tilting surface 334a and an outer tilting surface 334b, respectively. A part of the light-shielding layer 335 is coated on the outer tilting surfaces 334a, 334b. The design of the outer tilting surfaces 334a, 334b is favorable for mold releasing and element demolding, and can also provide an accumulating space for coating the light-shielding layer 335. Hence, the outer tilting surfaces 334a, 334b allow the plastic lens element 331 to be moved further towards the object side, and it is favorable for achieving miniaturization of the imaging lens assembly.

Figure 3F:
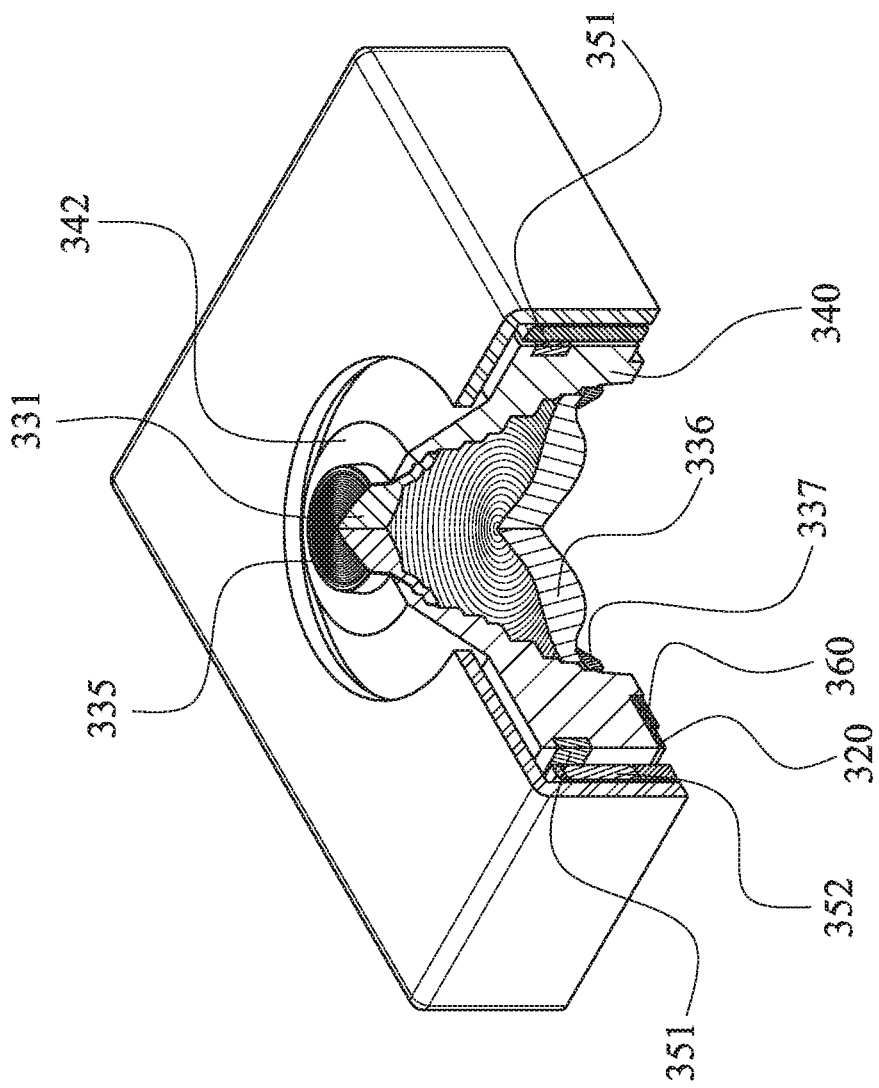
FIG. 3F is a partial sectional view of the object side of the lens driving apparatus according to the 3rd embodiment in FIG. 3A.
Figure 3G:
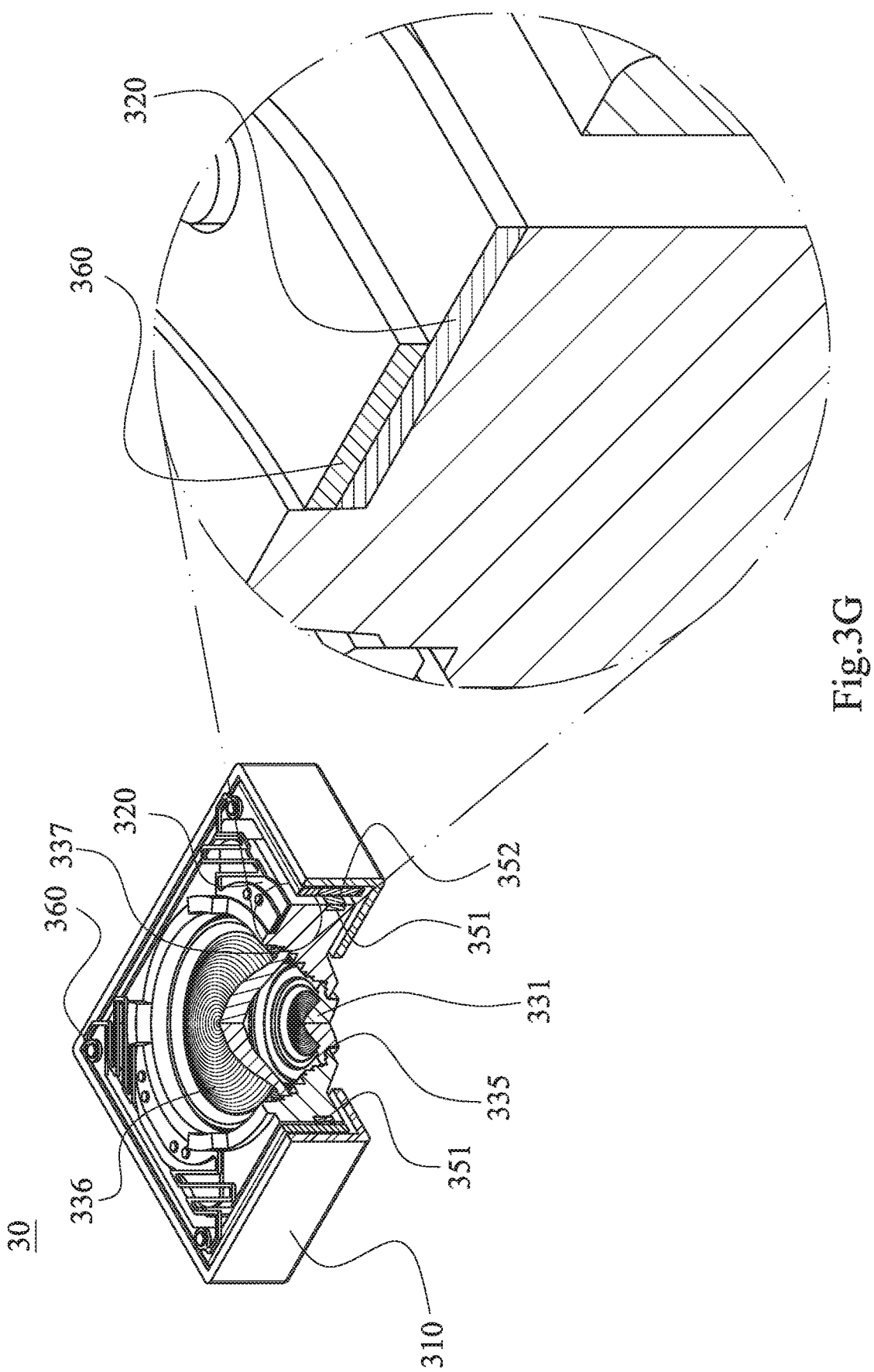
FIG. 3G is a partial sectional view of the image side of the lens driving apparatus according to the 3rd embodiment in FIG. 3A.

FIG. 3F shows a partial sectional view of the object side of the lens driving apparatus 30 according to the 3rd embodiment in FIG. 3A. FIG. 3G shows a partial sectional view of the image side of the lens driving apparatus 30 according to the 3rd embodiment in FIG. 3A. In FIGS. 3A, 3B, 3F and 3G, the driving mechanism 350 includes at least one coil and at least one magnet. According to the 3rd embodiment, the driving mechanism 350 includes one coil 351 and two magnets 352, but the present disclosure will not be limited thereto. The magnets 352 are disposed correspondingly with the coil 351. A driving magnetic force is generated by an interaction between the coil 351 and the magnets 352, so that the imaging lens assembly can be driven to move along a direction parallel to the optical axis X by the driving mechanism 350. Specifically, the driving magnetic force generated by the interaction between the coil 351 and the magnets 352 can be an electromagnetic driving force, and the driving magnetic force refers to the Lorentz force generated by an electromagnetic interaction.

The carrier element 340 is for configuring the imaging lens assembly and one of the coil 351 and the magnets 352 of the driving mechanism 350, and both of the plastic lens element 331 and one of the coil 351 and the magnets 352 of the driving mechanism 350 are directly contacted with the carrier element 340. An outer surface of the carrier element 340 further includes an assembling structure 341, which is directly contacted with one of the coil 351 and the magnets 352 of the driving mechanism 350, and is for arranging the coil 351 and the magnets 352 to face towards each other. The assembling structure 341 and the carrier element 340 are made integrally. Specifically, according to the 3rd embodiment, the carrier element 340 is for configuring the imaging lens assembly and the coil 351 of the driving mechanism 350, and the assembling structure 341 is directly contacted with the coil 351 of the driving mechanism 350.

Moreover, the carrier element 340 further includes a top surface 342, the top surface 342 is extended along the direction perpendicular to the optical axis X and faces towards the object side of the lens driving apparatus 30. Specifically, the carrier element 340 is configured with both of the imaging lens assembly and the driving mechanism 350 simultaneously, so that the functions of the conventional lens barrel and carrier are integrated for reducing producing costs. By configuring both of the imaging lens assembly and the driving mechanism 350 with the carrier element 340, assembling processes can be simplified and the manufacturing yield rate can be increased.

Specifically, the appearance of one side of the carrier element 340 towards the image side of the lens driving apparatus 30 can be a polygon. Therefore, the connecting structure of the sensor can be matched, and the convenience of element extraction in automatic producing processes can be improved. The polygon can be rectangular-shaped, and the polygon being rectangular-shaped has a plurality of chamfered corners 343. Moreover, the polygon can also be a hexagon or an octagon, but the present disclosure will not be limited thereto. Therefore, the spatial utilization efficiency of the space inside the lens driving apparatus 30 can be increased. Further, at least two gate traces are disposed at the chamfered corners 343 respectively. Moreover, a number of the gate traces can be at least three, but the injecting position will not be limited thereto. According to the 3rd embodiment, the number of the gate traces 344 is three. Thus, a high molding quality can be maintained, and the carrier element 340 with more complicated structures can be molded.

The leaf spring element 360 is assembled with the carrier element 340 and is located at the image side of the carrier element 340. Therefore, a suitable mechanical supporting structure and an ideal driving stroke configuration can be designed within a limited space by using the material characteristics. Furthermore, the metal conductive element 320 is disposed between the carrier element 340 and the leaf spring element 360, so that the buffer efficiency of the metal conductive element 320 is promoted.

In FIG. 3E, when the extending distance of the light-shielding layer 335 from the top surface 342 towards the object side of the lens driving apparatus 30 along the direction parallel to the optical axis X is H, the central thickness of the plastic lens element 331 is CT, the length of the light-shielding layer 335 along the direction parallel to the optical axis X is L, the extending distance of the light-shielding layer 335 from the top surface 342 towards the image side of the lens driving apparatus 30 along the direction parallel to the optical axis X is H2, the angle between the outer tilting surface 334a and the optical axis X is α1, and the angle between the outer tilting surface 334b and the optical axis X is α2, the conditions of the following Table 3 are satisfied. Specifically, a direction of the top surface 342 towards the object side is defined as positive, a direction of the top surface 342 towards the image side is defined as negative, the top surface 342 is perpendicular to the optical axis X, and the intersection of an extension line of the top surface 342 and the optical axis X is a zero point.

TABLE 3

| the 3rd embodiment | | | |
|---|---|---|---|
| H (mm) | 0.37 | H2/CT | −0.28 |
| CT (mm) | 0.89 | L (mm) | 0.62 |
| H/CT | 0.42 | α1(degree) | 5 |
| H2 (mm) | −0.25 | α2(degree) | 47.6 |

<4th embodiment>

4th Embodiment

Figure 4A:
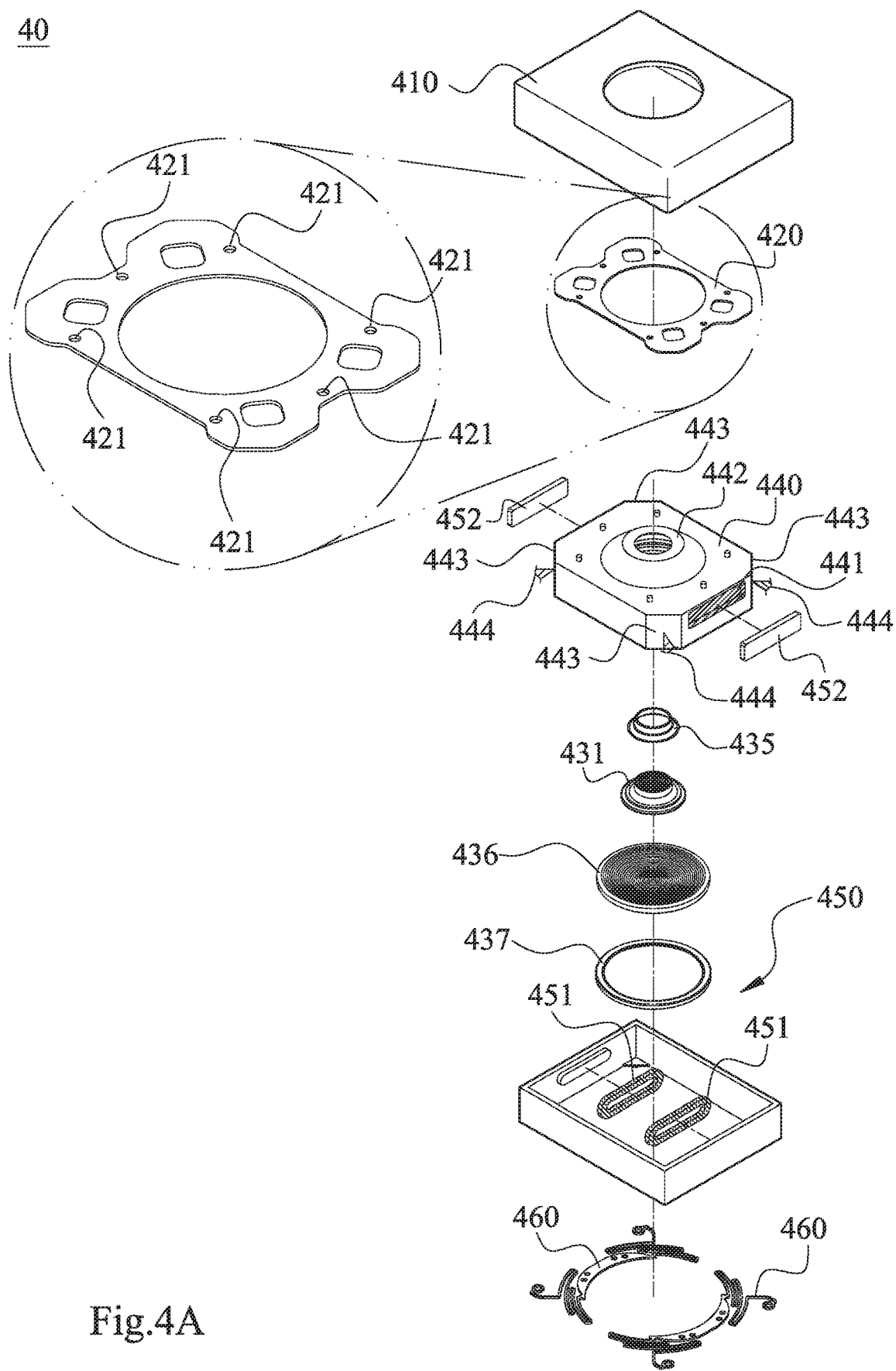
FIG. 4A is one exploded view of a lens driving apparatus according to a 4th embodiment of the present disclosure.
Figure 4B:
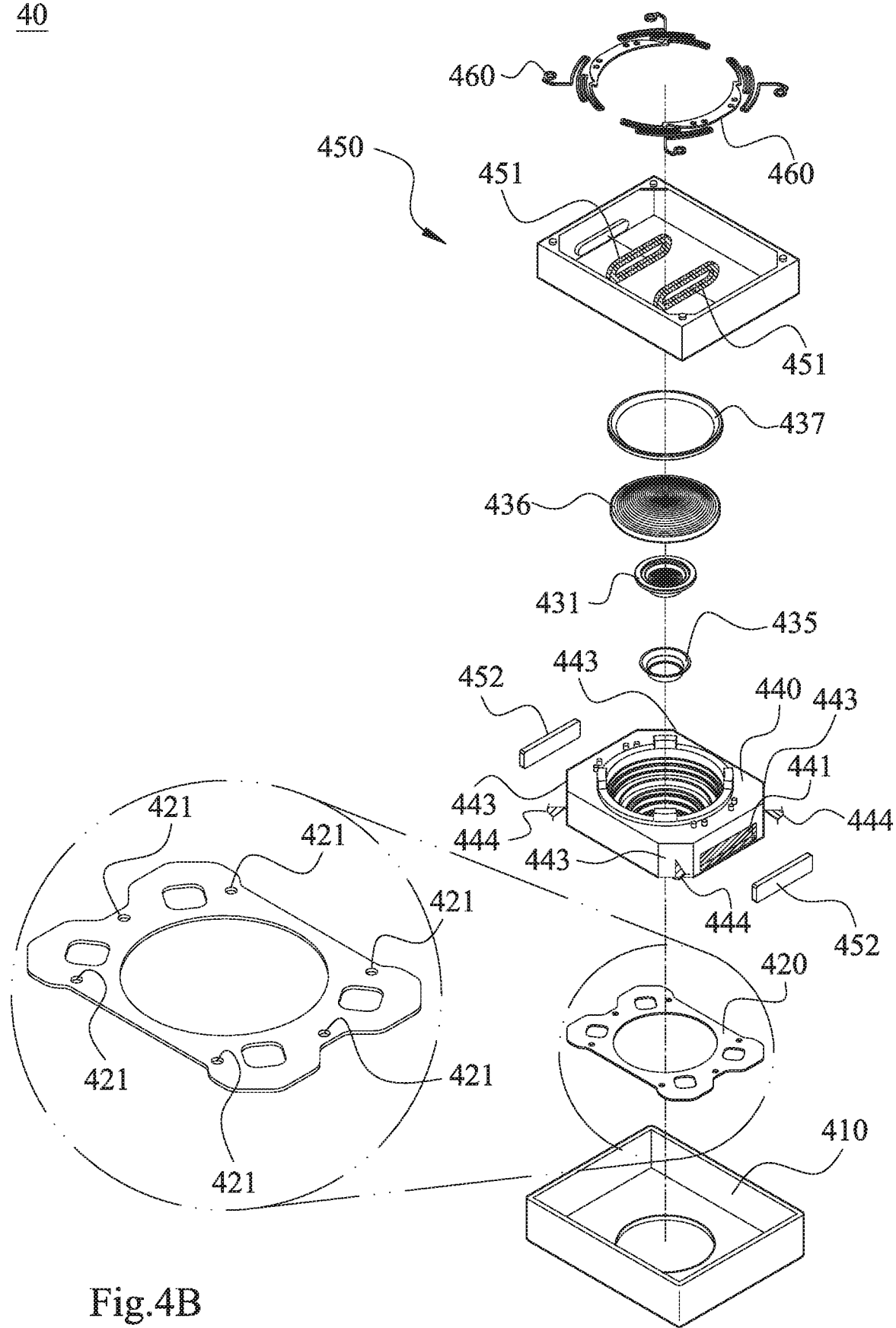
FIG. 4B is another exploded view of the lens driving apparatus according to the 4th embodiment in FIG. 4A.
Figure 4C:
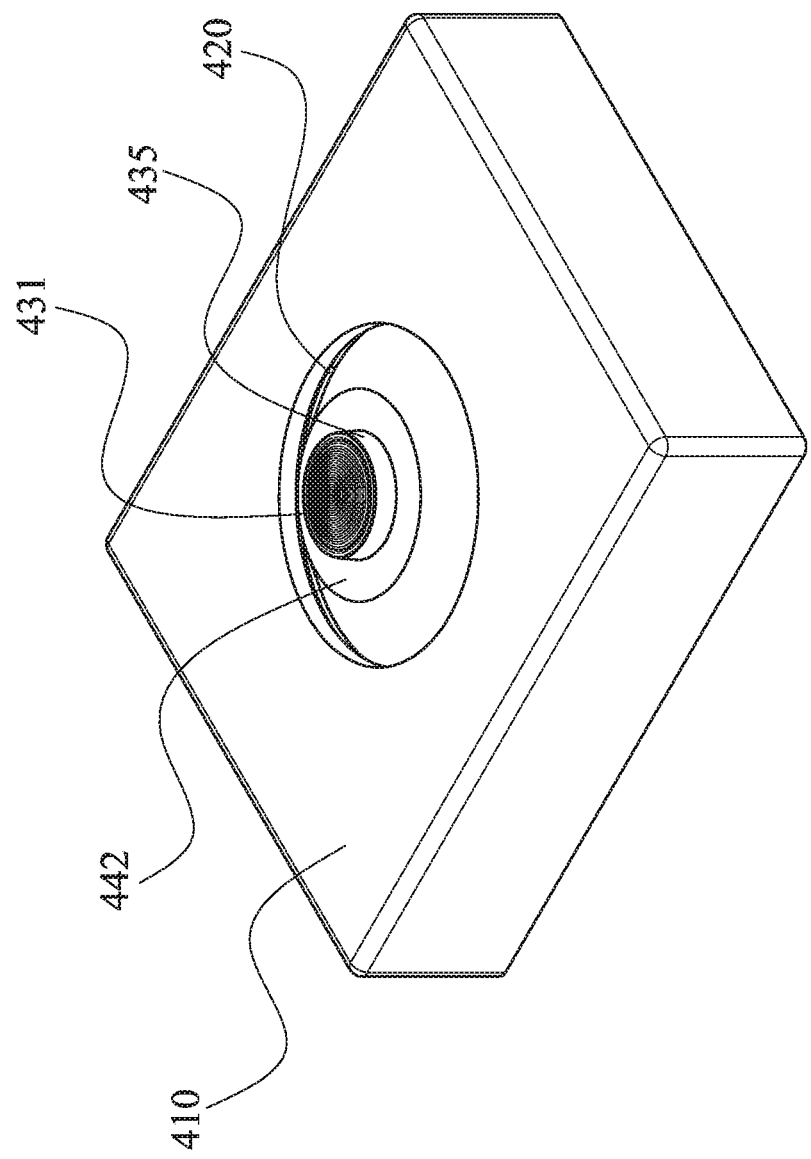
FIG. 4C is an assembling schematic view of an object side of the lens driving apparatus according to the 4th embodiment in FIG. 4A.
Figure 4D:
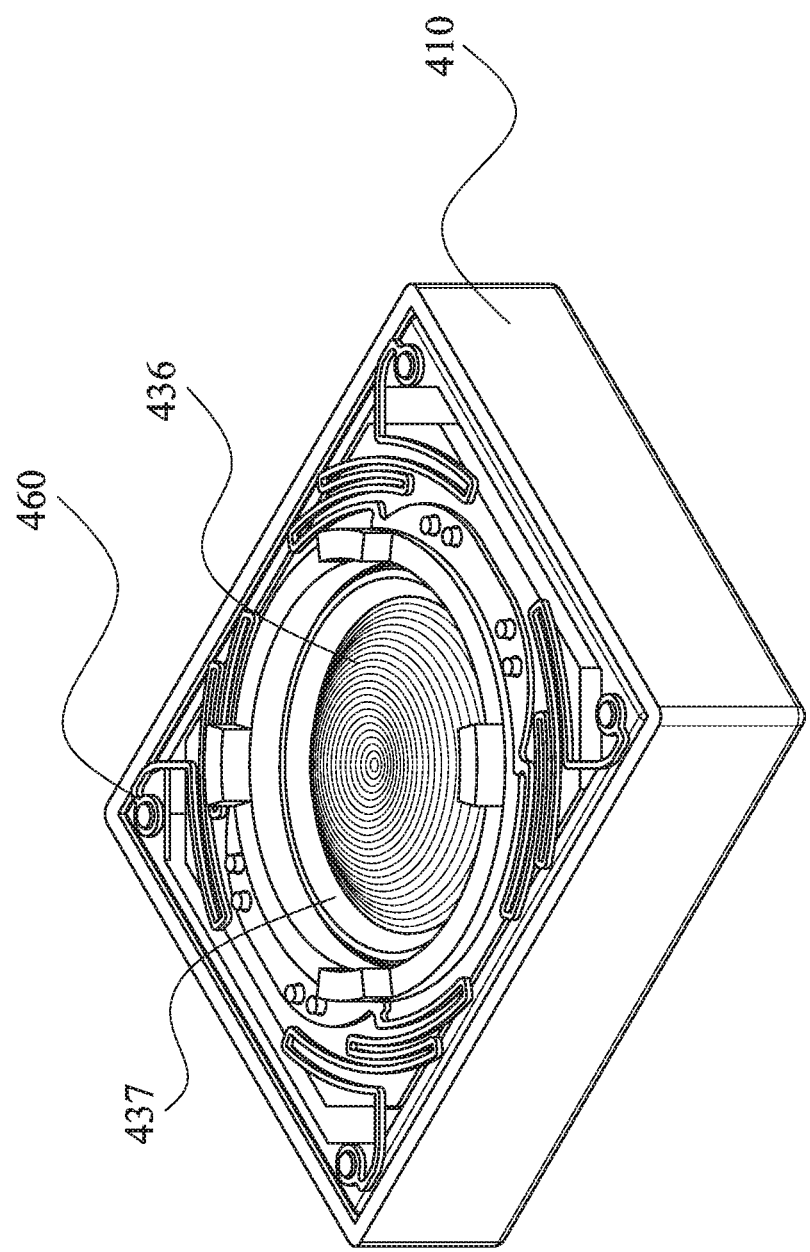
FIG. 4D is an assembling schematic view of an image side of the lens driving apparatus according to the 4th embodiment in FIG. 4A.

FIG. 4A shows one exploded view of a lens driving apparatus 40 according to a 4th embodiment of the present disclosure. FIG. 4B shows another exploded view of the lens driving apparatus 40 according to the 4th embodiment in FIG. 4A. FIG. 4C shows an assembling schematic view of an object side of the lens driving apparatus 40 according to the 4th embodiment in FIG. 4A. FIG. 4D shows an assembling schematic view of an image side of the lens driving apparatus 40 according to the 4th embodiment in FIG. 4A. According to FIGS. 4A-4D, the lens driving apparatus 40, in order from the object side to the image side, includes a cover 410, at least one metal conductive element 420, an imaging lens assembly (reference number is omitted), a carrier element 440, a driving mechanism 450, and a leaf spring element 460.

According to the 4th embodiment, a number of the metal conductive element 420 is one, but the present disclosure will not be limited thereto. The metal conductive element 420 is directly contacted with the carrier element 440, and the metal conductive element 420 is located at one of an object side and an image side of the carrier element 440. According to the 4th embodiment, the metal conductive element 420 is located at the object side of the carrier element 440, but the present disclosure will not be limited thereto. Specifically, the metal conductive element 420 can be a cushioning member, and the metal conductive element 420 can buffer the temperature gradient and pressure impacts applied to the carrier element 440 during assembling processes, thus increasing the manufacturing yield rate.

Moreover, the metal conductive element 420 includes at least two positioning holes 421, which are coupling with the carrier element 440. Specifically, the metal conductive element 420 can absorb the impact energy generated during assembling processes of the lens driving apparatus 40, so as to ensure the resolution of the imaging lens assembly would not be affected. With a number of at least two positioning holes 421, the self-rotation of the metal conductive element 420 can be limited so as to improve the assembling efficiency. Therefore, a margin for automatic assembling steps can be provided by the metal conductive element 420, and the mechanical assembling processes and electric welding processes can be separately controlled so as to reduce producing costs. Specifically, according to the 4th embodiment, the number of the positioning holes 421 is six, but the present disclosure will not be limited thereto.

Figure 4E:
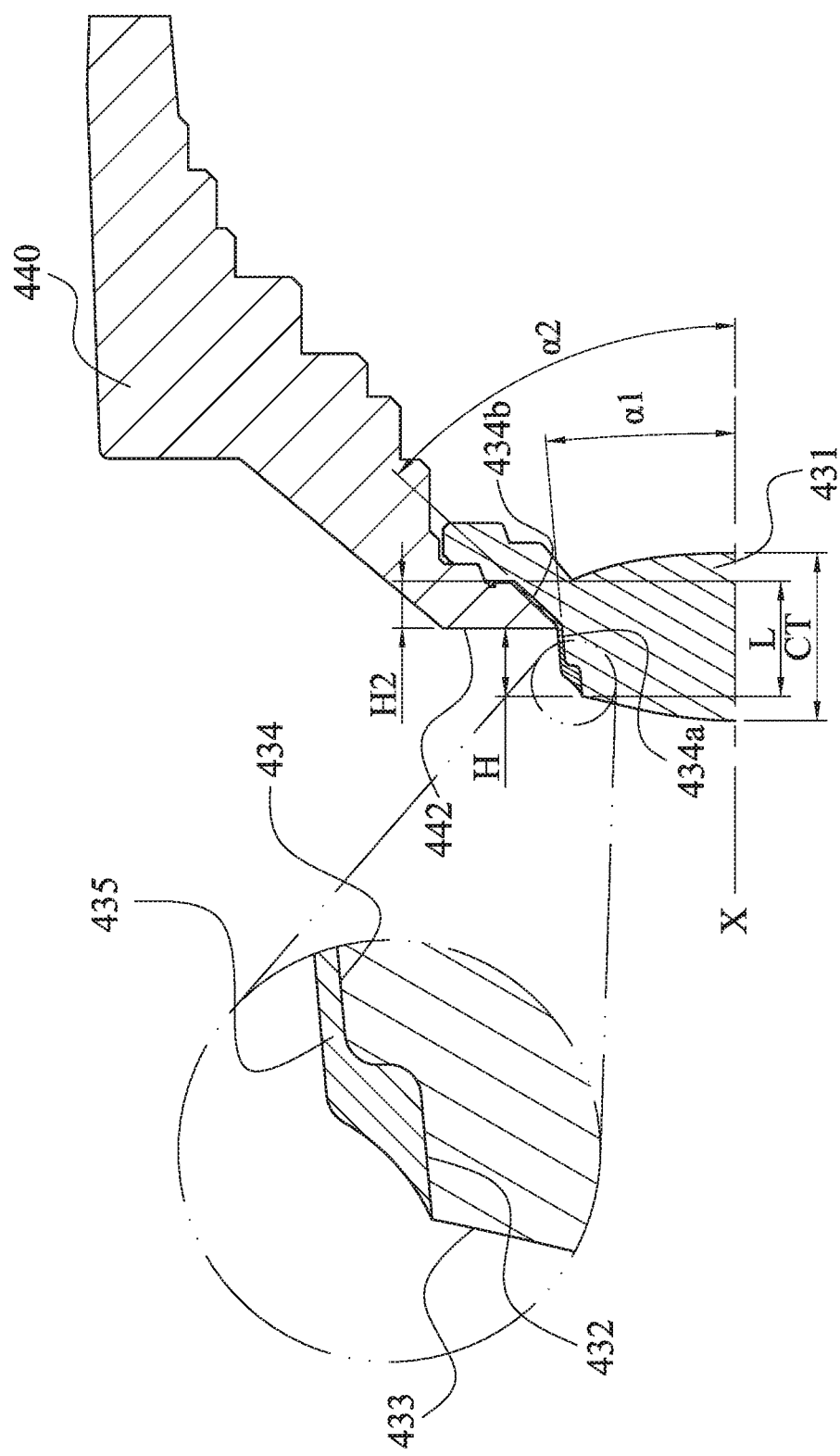
FIG. 4E is a partial schematic view of an imaging lens assembly and a carrier element according to the 4th embodiment in FIG. 4A.

FIG. 4E shows a partial schematic view of the imaging lens assembly and the carrier element 440 according to the 4th embodiment in FIG. 4A. In FIGS. 4A, 4B and 4E, the imaging lens assembly has an optical axis X and includes at least one plastic lens element 431, an annular step structure 432, a lens element 436 and a retainer 437. There is no additional one or more lens elements between the plastic lens element 431 and an imaged object (not shown). The plastic lens element 431, in order from a central region to a peripheral region, includes an effective optical portion 433, a peripheral portion 434 and a light-shielding layer 435. The optical axis X of the imaging lens assembly passes through the effective optical portion 433. The peripheral portion 434 surrounds the effective optical portion 433. The light-shielding layer 435 is disposed on an object side of the peripheral portion 434 of the plastic lens element 431 and surrounds the effective optical portion 433. Specifically, the light-shielding layer 435 is originally liquid and is opaque with an adhesion after curing. The light-shielding layer 435 can be a retaining element and can be used to control an amount of an incident light, so as to determine a bundle of the incident light. The annular step structure 432 surrounds the effective optical portion 433 in a full-circle form, and the annular step structure 432 is connected with the effective optical portion 433 and the peripheral portion 434. Specifically, the full-circle form refers to a situation in which the annular step structure 432 surrounds the effective optical portion 433 without disconnection. With the annular step structure 432 in the full-circle form, it is favorable for element demolding so as to improve the flatness of the bearing surface.

In FIG. 4A and FIG. 4B, the lens element 436 is disposed at an image side of the plastic lens element 431, and the retainer 437 is disposed at an image side of the lens element 436. The optical characteristics of the lens element and the retainer, such as numbers, structures and lens surface shapes can be configured according to different imaging requirements, and other optical elements can be arranged according to requirements, the present disclosure will not be limited thereto.

Specifically, a part of the light-shielding layer 435 does not overlap with the carrier element 440 in a direction perpendicular to the optical axis X, which can be refer to as the light-shielding layer 435 is exposed to the air, or the aforementioned part of the light-shielding layer 435 is located at the object side of the carrier element 440, but the present disclosure will not be limited thereto. Therefore, the light-shielding layer 435 can be adaptively filled into a special spatial configuration between the optical elements so as to be accumulated at an ideal light-shielding position, thus improving the performance of shielding stray light. Moreover, it is favorable for miniaturization of the imaging lens assembly by designing the light-shielding layer 435 as a light entrance.

Further, a part of the light-shielding layer 435 is coated on the annular step structure 432. Specifically, the annular step structure 432 can accumulate the light-shielding layer 435, so that the optical density of a part of the annular step structure 432 can be increased. Therefore, the image recognition error caused by coating the light-shielding layer 435 can be reduced, and the efficiency of automatic production can be improved.

The peripheral portion 434 of the plastic lens element 431 can further include at least one outer tilting surface. Specifically, according to the 4th embodiment, a number of the outer tilting surface can be N, and N is two. Each of the two outer tilting surfaces is an outer tilting surface 434a and an outer tilting surface 434b, respectively. A part of the light-shielding layer 435 is coated on the outer tilting surfaces 434a, 434b. The design of the outer tilting surfaces 434a, 434b is favorable for mold releasing and element demolding, and can also provide an accumulating space for coating the light-shielding layer 435. Hence, the outer tilting surfaces 434a, 434b allow the plastic lens element 431 to be moved further towards the object side, and it is favorable for achieving miniaturization of the imaging lens assembly.

Figure 4F:
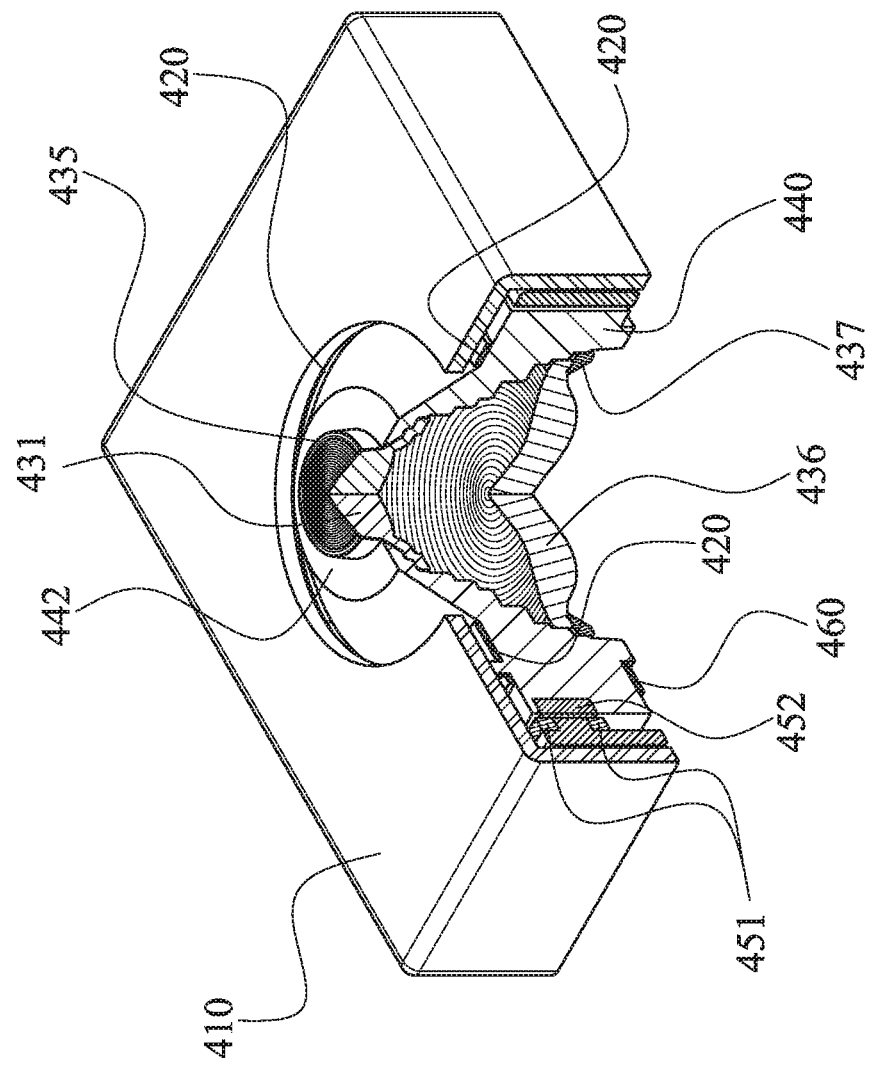
FIG. 4F is a partial sectional view of the object side of the lens driving apparatus according to the 4th embodiment in FIG. 4A.
Figure 4G:
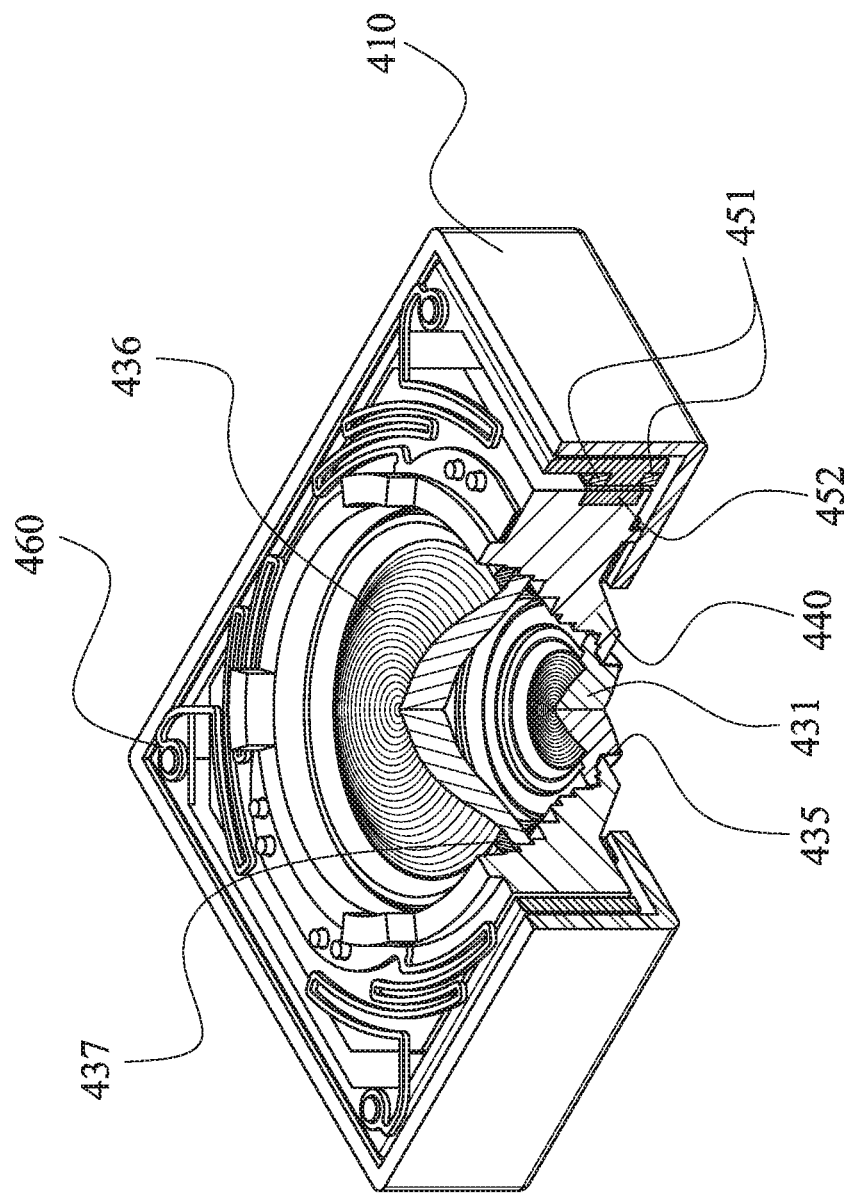
FIG. 4G is a partial sectional view of the image side of the lens driving apparatus according to the 4th embodiment in FIG. 4A.

FIG. 4F shows a partial sectional view of the object side of the lens driving apparatus 40 according to the 4th embodiment in FIG. 4A. FIG. 4G shows a partial sectional view of the image side of the lens driving apparatus 40 according to the 4th embodiment in FIG. 4A. In FIGS. 4A, 4B, 4F and 4G, the driving mechanism 450 includes at least one coil and at least one magnet, and a number of the coil can be at least two. According to the 4th embodiment, the driving mechanism 450 includes two coils 451 and two magnets 452, but the present disclosure will not be limited thereto. The magnets 452 are disposed correspondingly with the coils 451. A driving magnetic force is generated by an interaction between the coils 451 and the magnets 452, so that the imaging lens assembly can be driven to move along a direction parallel to the optical axis X by the driving mechanism 450. Specifically, the driving magnetic force generated by the interaction between the coils 451 and the magnets 452 can be an electromagnetic driving force, and the driving magnetic force refers to the Lorentz force generated by an electromagnetic interaction.

The carrier element 440 is for configuring the imaging lens assembly and one of the coils 451 and the magnets 452 of the driving mechanism 450, and both of the plastic lens element 431 and one of the coils 451 and the magnets 452 of the driving mechanism 450 are directly contacted with the carrier element 440. An outer surface of the carrier element 440 further includes an assembling structure 441, which is directly contacted with one of the coils 451 and the magnets 452 of the driving mechanism 450, and is for arranging the coils 451 and the magnets 452 to face towards each other. The assembling structure 441 and the carrier element 440 are made integrally. Specifically, according to the 4th embodiment, the carrier element 440 is for configuring the imaging lens assembly and the magnets 452 of the driving mechanism 450, and the assembling structure 441 is directly contacted with the magnets 452 of the driving mechanism 450.

Moreover, the carrier element 440 further includes a top surface 442, the top surface 442 is extended along the direction perpendicular to the optical axis X and faces towards the object side of the lens driving apparatus 40. Specifically, the carrier element 440 is configured with both of the imaging lens assembly and the driving mechanism 450 simultaneously, so that the functions of the conventional lens barrel and carrier are integrated for reducing producing costs. By configuring both of the imaging lens assembly and the driving mechanism 450 with the carrier element 440, assembling processes can be simplified and the manufacturing yield rate can be increased.

Specifically, the appearance of one side of the carrier element 440 towards the image side of the lens driving apparatus 40 can be a polygon. Therefore, the connecting structure of the sensor can be matched, and the convenience of element extraction in automatic producing processes can be improved. The polygon can be rectangular-shaped, and the polygon being rectangular-shaped has a plurality of chamfered corners 443. Moreover, the polygon can also be a hexagon or an octagon, but the present disclosure will not be limited thereto. Therefore, the spatial utilization efficiency of the space inside the lens driving apparatus 40 can be increased. Further, at least two gate traces are disposed at the chamfered corners 443 respectively. Moreover, a number of the gate traces can be at least three, but the injecting position will not be limited thereto. According to the 4th embodiment, the number of the gate traces 444 is three.

Thus, a high molding quality can be maintained, and the carrier element 440 with more complicated structures can be molded.

Furthermore, the coils 451 are correspondingly disposed along the optical axis X of the imaging lens assembly, and are disposed on two sides of the polygon being rectangular-shaped which are correspondingly disposed. Therefore, the Lorentz force generated by the electromagnetic interaction can be increased so as to promote the driving efficiency.

The leaf spring element 460 is assembled with the carrier element 440 and is located at the image side of the carrier element 440. Therefore, a suitable mechanical supporting structure and an ideal driving stroke configuration can be designed within a limited space by using the material characteristics.

In FIG. 4E, when the extending distance of the light-shielding layer 435 from the top surface 442 towards the object side of the lens driving apparatus 40 along the direction parallel to the optical axis X is H, the central thickness of the plastic lens element 431 is CT, the length of the light-shielding layer 435 along the direction parallel to the optical axis X is L, the extending distance of the light-shielding layer 435 from the top surface 442 towards the image side of the lens driving apparatus 40 along the direction parallel to the optical axis X is H2, the angle between the outer tilting surface 434a and the optical axis X is $\alpha 1$, and the angle between the outer tilting surface 434b and the optical axis X is $\alpha 2$, the conditions of the following Table 4 are satisfied. Specifically, a direction of the top surface 442 towards the object side is defined as positive, a direction of the top surface 442 towards the image side is defined as negative, the top surface 442 is perpendicular to the optical axis X, and the intersection of an extension line of the top surface 442 and the optical axis X is a zero point.

TABLE 4

| the 4th embodiment | | | |
|---|---|---|---|
| H (mm) | 0.36 | H2/CT | −0.28 |
| CT (mm) | 0.89 | L (mm) | 0.61 |
| H/CT | 0.40 | $\alpha 1$(degree) | 5 |
| H2 (mm) | −0.25 | $\alpha 2$(degree) | 47.6 |

<5th embodiment>

5th Embodiment

Figure 5:
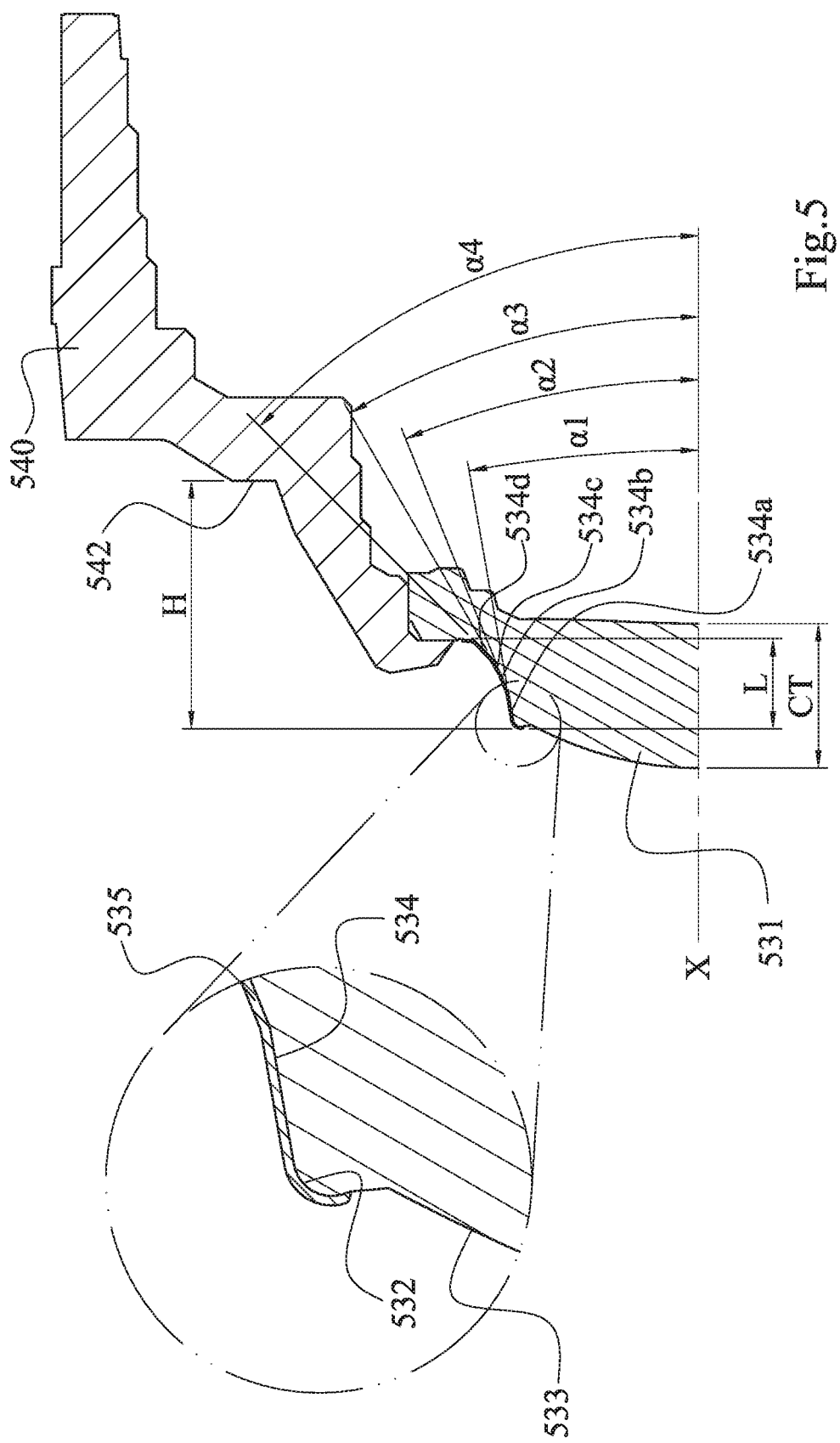
FIG. 5 is a partial schematic view of an imaging lens assembly and a carrier element according to the 5th embodiment of the present disclosure.

FIG. 5 shows a partial schematic view of an imaging lens assembly (not shown) and a carrier element 540 according to the 5th embodiment of the present disclosure. In FIG. 5, the imaging lens assembly has an optical axis X and includes at least one plastic lens element 531, an annular step structure 532, a lens element (not shown) and a retainer (not shown). There is no additional one or more lens elements between the plastic lens element 531 and an imaged object (not shown). The plastic lens element 531, in order from a central region to a peripheral region, includes an effective optical portion 533, a peripheral portion 534 and a light-shielding layer 535. The optical axis X of the imaging lens assembly passes through the effective optical portion 533. The peripheral portion 534 surrounds the effective optical portion 533. The light-shielding layer 535 is disposed on an object side of the peripheral portion 534 of the plastic lens element 531 and surrounds the effective optical portion 533. Specifically, the light-shielding layer 535 is originally liquid and is opaque with an adhesion after curing. The light-shielding layer 535 can be a retaining element and can be used to control an amount of an incident light, so as to determine a bundle of the incident light. The annular step structure 532 surrounds the effective optical portion 533 in a full-circle form, and the annular step structure 532 is connected with the effective optical portion 533 and the peripheral portion 534. Specifically, the full-circle form refers to a situation in which the annular step structure 532 surrounds the effective optical portion 533 without disconnection. With the annular step structure 532 in the full-circle form, it is favorable for element demolding so as to improve the flatness of the bearing surface.

Specifically, the lens element is disposed at an image side of the plastic lens element 531, and the retainer is disposed at an image side of the lens element. The optical characteristics of the lens element and the retainer, such as numbers, structures and lens surface shapes can be configured according to different imaging requirements, and other optical elements can be arranged according to requirements, the present disclosure will not be limited thereto.

Specifically, a part of the light-shielding layer 535 does not overlap with the carrier element 540 in a direction perpendicular to the optical axis X, which can be refer to as the light-shielding layer 535 is exposed to the air, or the aforementioned part of the light-shielding layer 535 is located at the object side of the carrier element 540, but the present disclosure will not be limited thereto. Therefore, the light-shielding layer 535 can be adaptively filled into a special spatial configuration between the optical elements so as to be accumulated at an ideal light-shielding position, thus improving the performance of shielding stray light. Moreover, it is favorable for miniaturization of the imaging lens assembly by designing the light-shielding layer 535 as a light entrance.

Further, a part of the light-shielding layer 535 is coated on the annular step structure 532. Specifically, the annular step structure 532 can accumulate the light-shielding layer 535, so that the optical density of a part of the annular step structure 532 can be increased. Therefore, the image recognition error caused by coating the light-shielding layer 535 can be reduced, and the efficiency of automatic production can be improved.

The peripheral portion 534 of the plastic lens element 531 can further include at least one outer tilting surface. Specifically, according to the 5th embodiment, a number of the outer tilting surface can be N, and N is four. Each of the four outer tilting surfaces is an outer tilting surface 534a, 534b, 534c and 534d, respectively. A part of the light-shielding layer 535 is coated on the outer tilting surfaces 534a, 534b, 534c, 534d. The design of the outer tilting surfaces 534a, 534b, 534c, 534d is favorable for mold releasing and element demolding, and can also provide an accumulating space for coating the light-shielding layer 535. Hence, the outer tilting surfaces 534a, 534b, 534c, 534d allow the plastic lens element 531 to be moved further towards the object side, and it is favorable for achieving miniaturization of the imaging lens assembly.

Since the only differences between the 5th embodiment and the 4th embodiment are the carrier element and the imaging lens assembly, and other characteristics such as numbers of the elements and arrangements remain the same, the related details would not be described below.

In FIG. 5, when the extending distance of the light-shielding layer 535 from the top surface 542 towards an object side of the lens driving apparatus (not shown) along a direction parallel to the optical axis X is H, the central thickness of the plastic lens element 531 is CT, the length of the light-shielding layer 535 along the direction parallel to the optical axis X is L, the extending distance of the light-shielding layer 535 from the top surface 542 towards an image side of the lens driving apparatus (not shown) along the direction parallel to the optical axis X is H2, the angle between the outer tilting surface 534a and the optical axis X is α1, the angle between the outer tilting surface 534b and the optical axis X is α2, the angle between the outer tilting surface 534c and the optical axis X is α3, and the angle between the outer tilting surface 534d and the optical axis X is α4, the conditions of the following Table 5 are satisfied. Specifically, a direction of the top surface 542 towards an object side is defined as positive, a direction of the top surface 542 towards an image side is defined as negative, the top surface 542 is perpendicular to the optical axis X, and the intersection of an extension line of the top surface 542 and the optical axis X is a zero point.

TABLE 5

| the 5th embodiment | | | |
|---|---|---|---|
| H (mm) | 1.3 | L (mm) | 0.47 |
| CT (mm) | 0.76 | α1(degree) | 10 |
| H/CT | 1.71 | α2(degree) | 22 |
| H2 (mm) | 0 | α3(degree) | 30 |
| H2/CT | 0 | α4(degree) | 45 |
| | <6th embodiment> | | |

6th Embodiment

Figure 6:
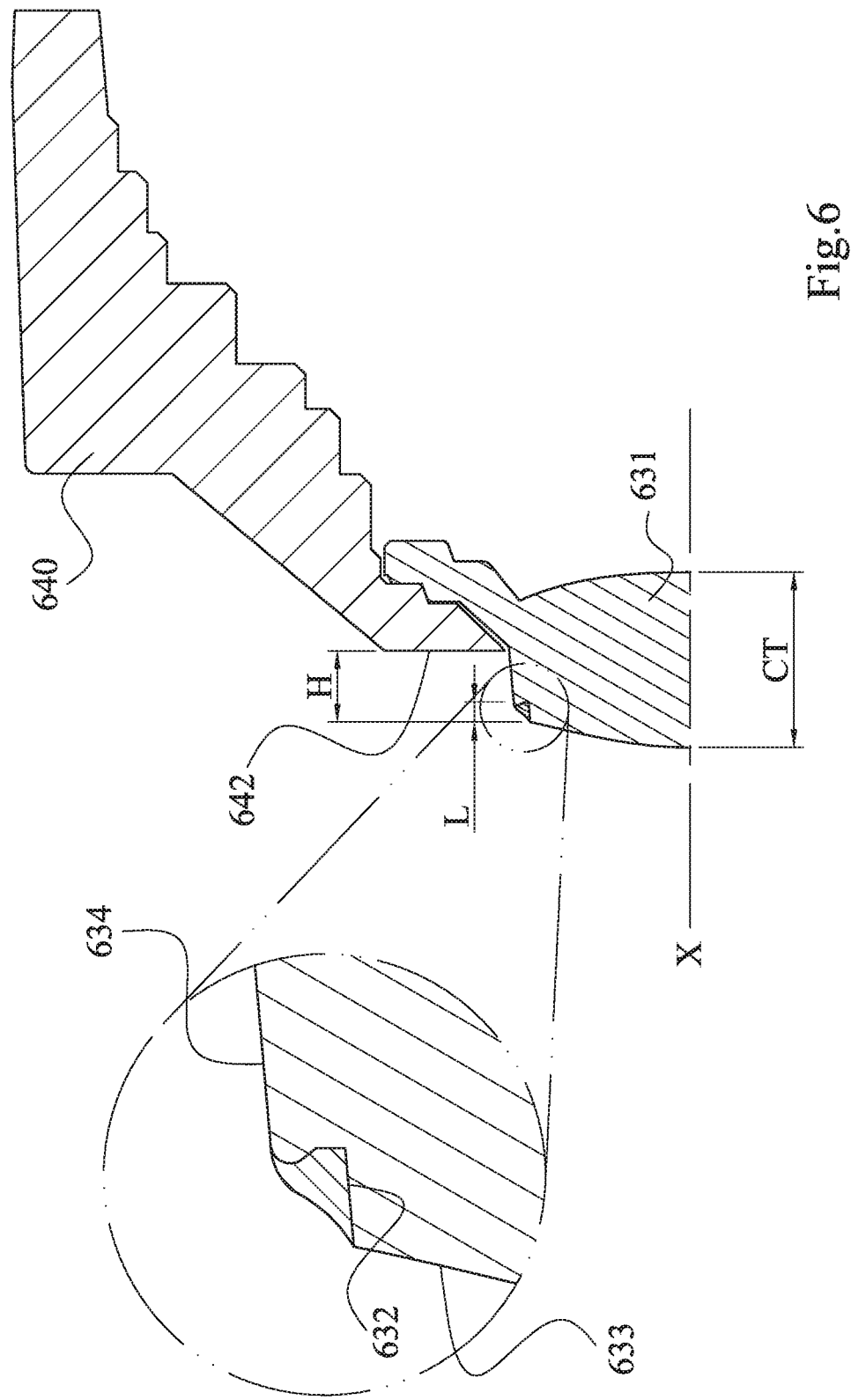
FIG. 6 is a partial schematic view of an imaging lens assembly and a carrier element according to the 6th embodiment of the present disclosure.

FIG. 6 shows a partial schematic view of an imaging lens assembly (not shown) and a carrier element 640 according to the 6th embodiment of the present disclosure. In FIG. 6, the imaging lens assembly has an optical axis X and includes at least one plastic lens element 631, an annular step structure 632, a lens element (not shown) and a retainer (not shown). There is no additional one or more lens elements between the plastic lens element 631 and an imaged object (not shown). The plastic lens element 631, in order from a central region to a peripheral region, includes an effective optical portion 633, a peripheral portion 634 and a light-shielding layer 635. The optical axis X of the imaging lens assembly passes through the effective optical portion 633. The peripheral portion 634 surrounds the effective optical portion 633. The light-shielding layer 635 is disposed on an object side of the peripheral portion 634 of the plastic lens element 631 and surrounds the effective optical portion 633. Specifically, the light-shielding layer 635 is originally liquid and is opaque with an adhesion after curing. The light-shielding layer 635 can be a retaining element and can be used to control an amount of an incident light, so as to determine a bundle of the incident light. The annular step structure 632 surrounds the effective optical portion 633 in a full-circle form, and the annular step structure 632 is connected with the effective optical portion 633 and the peripheral portion 634. Specifically, the full-circle form refers to a situation in which the annular step structure 632 surrounds the effective optical portion 633 without disconnection. With the annular step structure 632 in the full-circle form, it is favorable for element demolding so as to improve the flatness of the bearing surface.

Specifically, the lens element is disposed at an image side of the plastic lens element 631, and the retainer is disposed at an image side of the lens element. The optical characteristics of the lens element and the retainer, such as numbers, structures and lens surface shapes can be configured according to different imaging requirements, and other optical elements can be arranged according to requirements, the present disclosure will not be limited thereto.

Specifically, a part of the light-shielding layer 635 does not overlap with the carrier element 640 in a direction perpendicular to the optical axis X, which can be refer to as the light-shielding layer 635 is exposed to the air, or the aforementioned part of the light-shielding layer 635 is located at the object side of the carrier element 640, but the present disclosure will not be limited thereto. Therefore, the light-shielding layer 635 can be adaptively filled into a special spatial configuration between the optical elements so as to be accumulated at an ideal light-shielding position, thus improving the performance of shielding stray light. Moreover, it is favorable for miniaturization of the imaging lens assembly by designing the light-shielding layer 635 as a light entrance.

Further, a part of the light-shielding layer 635 is coated on the annular step structure 632. Specifically, the annular step structure 632 can accumulate the light-shielding layer 635, so that the optical density of a part of the annular step structure 632 can be increased. Therefore, the image recognition error caused by coating the light-shielding layer 635 can be reduced, and the efficiency of automatic production can be improved.

Since the only differences between the 6th embodiment and the 4th embodiment are the carrier element and the imaging lens assembly, and other characteristics such as numbers of the elements and arrangements remain the same, the related details would not be described below.

In FIG. 6, when the extending distance of the light-shielding layer 635 from the top surface 642 towards an object side of the lens driving apparatus (not shown) along a direction parallel to the optical axis X is H, the central thickness of the plastic lens element 631 is CT, the length of the light-shielding layer 635 along the direction parallel to the optical axis X is L, and the extending distance of the light-shielding layer 635 from the top surface 642 towards an image side of the lens driving apparatus (not shown) along the direction parallel to the optical axis X is H2, the conditions of the following Table 6 are satisfied. Specifically, a direction of the top surface 642 towards an object side is defined as positive, a direction of the top surface 642 towards an image side is defined as negative, the top surface 642 is perpendicular to the optical axis X, and the intersection of an extension line of the top surface 642 and the optical axis X is a zero point.

TABLE 6 the 6th embodiment

| H (mm) | 0.36 | H2 (mm) | 0 |
| CT (mm) | 0.89 | H2/CT | 0 |
| H/CT | 0.40 | L (mm) | 0.1 |

<7th embodiment>

7th Embodiment

Figure 7A:
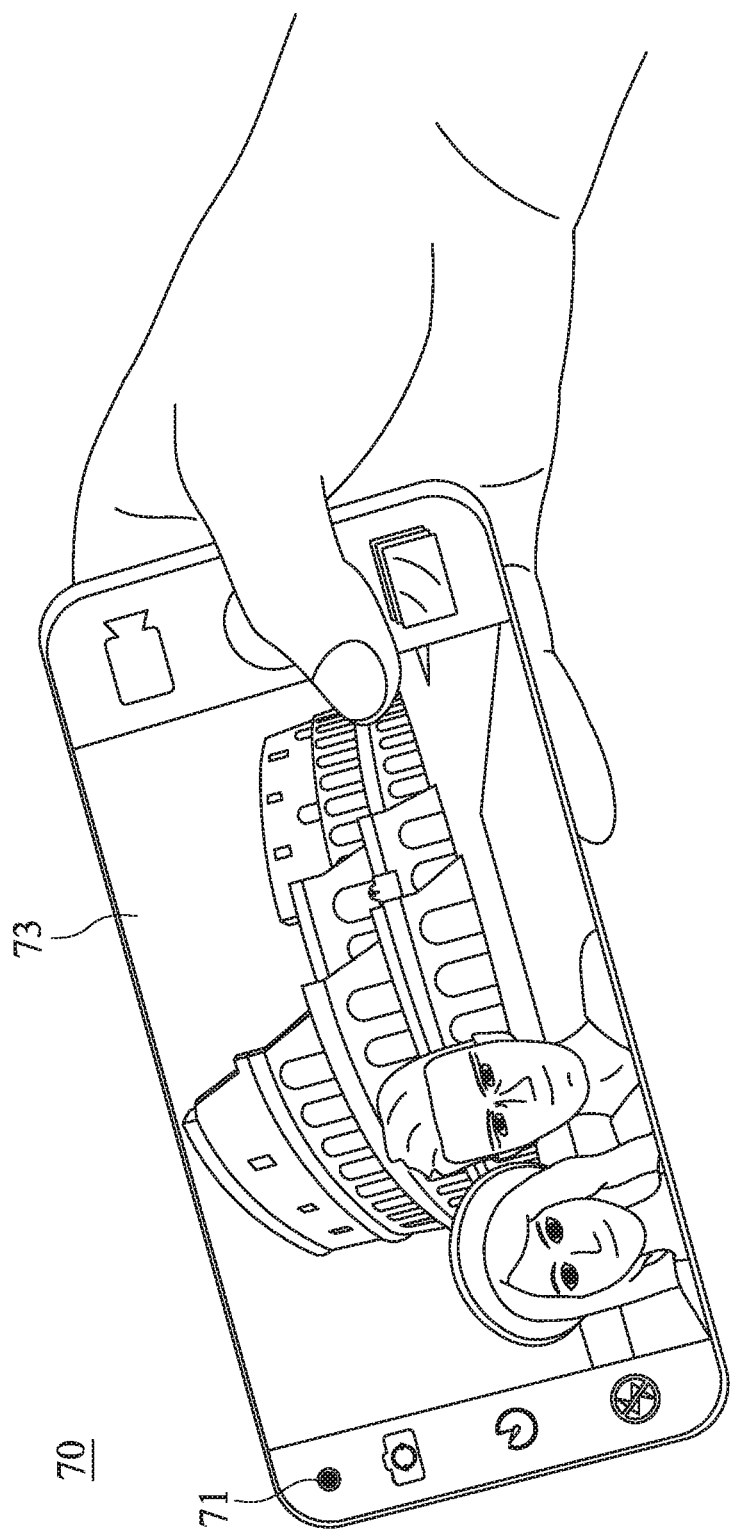
FIG. 7A is a schematic view of an electronic device according to the 7th embodiment of the present disclosure.

FIG. 7A is a schematic view of an electronic device 70 according to the 7th embodiment of the present disclosure. FIG. 7B is a block diagram of the electronic device 70 according to the 7th embodiment in FIG. 7A. In FIGS. 7A and 7B, the electronic device 70 is a smart phone, and includes a lens driving apparatus 71, a user interface 73 and an image sensor 72. The lens driving apparatus 71 according to the 7th embodiment is disposed on an area of side of the user interface 73, the image sensor 72 is disposed on an image surface (not shown) of the lens driving apparatus 71, wherein the user interface 73 can be a touch screen or a display screen, but is not limited thereto. The lens driving apparatus 71 can be one of the lens driving apparatus according to the aforementioned 1st embodiment to the 6th embodiment, and the lens driving apparatus 71 includes an imaging lens assembly (not shown), a driving mechanism (not shown) and a carrier element, but the present disclosure will not be limited thereto.

Moreover, users enter a shooting mode via the user interface 73 of the electronic device 70. At this moment, the imaging light is gathered on the image sensor 72 via the lens driving apparatus 71, and an electronic signal about an image is output to an image signal processor (ISP) 74.

To meet a specification of the camera module of the electronic device 70, the electronic device 70 can further include an optical anti-shake mechanism 75, which can be an optical image stabilization (OIS). Furthermore, the electronic device 70 can further include at least one auxiliary optical element (its reference numeral is omitted) and at least one sensing element 76. According to the 7th embodiment, the auxiliary optical element is a flash module 77 and a focusing assisting module 78. The flash module 77 can be used for compensating a color temperature, and the focusing assisting module 78 can be an infrared distance measurement component, a laser focus module, etc. The sensing element 76 can have functions for sensing physical momentum and kinetic energy, such as an accelerator, a gyroscope, a Hall Effect Element, to sense shaking or jitters applied by hands of the users or external environments. Accordingly, an auto-focusing mechanism and the optical anti-shake mechanism 75 disposed on the lens driving apparatus 71 of the electronic device 70 can be enhanced to achieve the superior image quality. Furthermore, the electronic device 70 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 70 can further include, but not be limited to, a display, a control unit, a storage unit, a random access memory (RAM), a read-only memory (ROM), or the combination thereof.

Figure 7C:
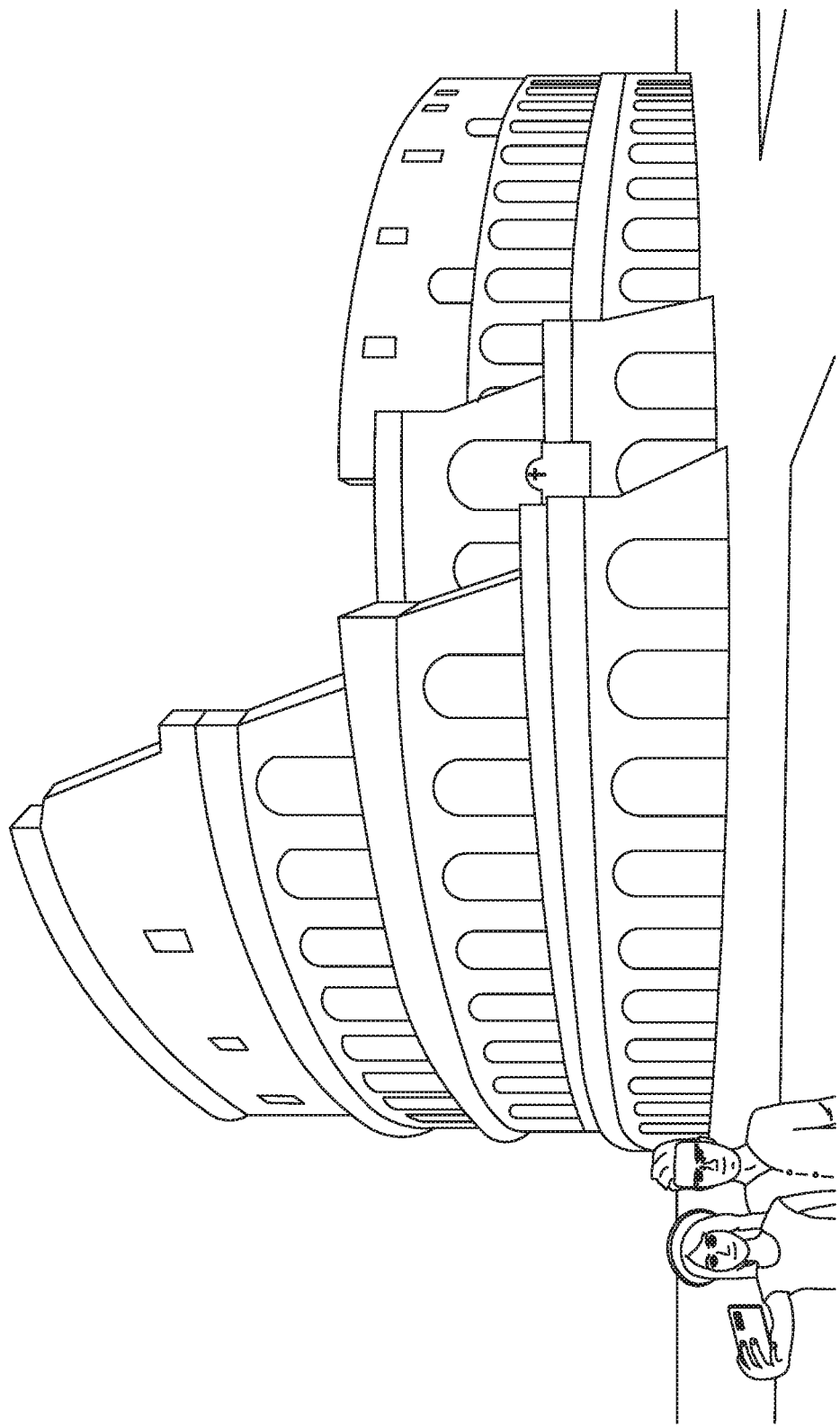
FIG. 7C is a schematic view of a selfie scene according to the 7th embodiment of FIG. 7A.
Figure 7D:
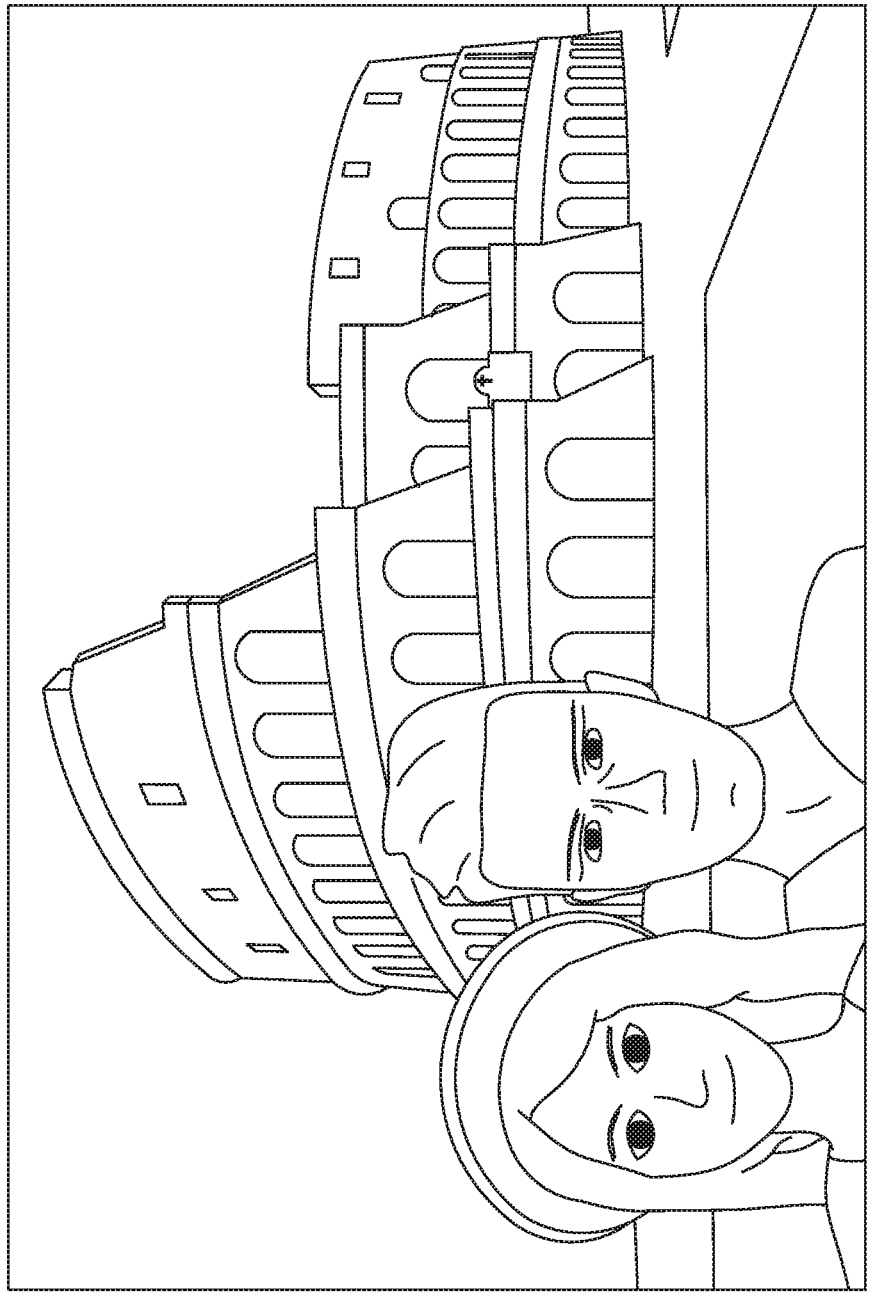
FIG. 7D is a schematic view of a shot image according to the 7th embodiment of FIG. 7A.

FIG. 7C is a schematic view of selfie scene according to the 7th embodiment in FIG. 7A. FIG. 7D is a schematic view of a captured image according to the 7th embodiment in FIG. 7A. In FIGS. 7A to 7D, the lens driving apparatus 71 and the user interface 73 face towards the users. When proceeding selfie or live streaming, the users can watch a captured image and operate an interface at the same time, and the capture image as FIG. 7D can be obtained after shooting. Therefore, better shooting experience can be provided via the lens driving apparatus 71 of the present disclosure.

The foregoing description, for purpose of explanation, has been described with reference to specific examples. It is to be noted that Tables show different data of the different examples, however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A lens driving apparatus, comprising:
an imaging lens assembly having an optical axis, comprising:
at least one plastic lens element, wherein there is no additional one or more lens elements between an imaged object and the at least one plastic lens element, and the at least one plastic lens element comprises, in order from a central region to a peripheral region:
an effective optical portion, the optical axis of the imaging lens assembly passing through the effective optical portion;
a peripheral portion surrounding the effective optical portion; and
a light-shielding layer disposed on an object side of the peripheral portion of the at least one plastic lens element and surrounding the effective optical portion;
a driving mechanism, comprising:
at least one coil; and
at least one magnet disposed correspondingly with the at least one coil, wherein a driving magnetic force is generated by an interaction between the at least one coil and the at least one magnet, so that the driving mechanism drives the imaging lens assembly to move along a direction parallel to the optical axis; and
a carrier element for configuring the imaging lens assembly and one of the at least one coil and the at least one magnet of the driving mechanism, both of the at least one plastic lens element and the one of the at least one coil and the at least one magnet of the driving mechanism directly contacted with the carrier element, and an outer surface of the carrier element comprising:
an assembling structure, which is directly contacted with the one of the at least one coil and the at least one magnet of the driving mechanism and for arranging the at least one coil and the at least one magnet facing towards each other, and the assembling structure and the carrier element made integrally;
wherein a part of the light-shielding layer does not overlap with the carrier element in a direction perpendicular to the optical axis;
wherein the carrier element further comprises a top surface, the top surface extends along the direction perpendicular to the optical axis and faces towards an object side of the lens driving apparatus, an extending distance of the light-shielding layer from the top surface to the object side of the lens driving apparatus along the direction parallel to the optical axis is H, a central thickness of the at least one plastic lens element is CT, a length of the light-shielding layer along the direction parallel to the optical axis is L, and the following conditions are satisfied:

$0 < H/CT < 3;$ and $0 \text{ mm} < L < 1.2 \text{ mm}.$

2. The lens driving apparatus of claim 1, wherein the length of the light-shielding layer along the direction parallel to the optical axis is L, and the following condition is satisfied:

$0.1 \text{ mm} < L < 0.9 \text{ mm}.$

3. The lens driving apparatus of claim 2, wherein the extending distance of the light-shielding layer from the top surface to the object side of the lens driving apparatus along the direction parallel to the optical axis is H, the central thickness of the at least one plastic lens element is CT, and the following condition is satisfied:

$0.1 < H/CT \leq 2.$

4. The lens driving apparatus of claim 2, wherein an extending distance of the light-shielding layer from the top surface to an image side of the lens driving apparatus along the direction parallel to the optical axis is H2, the central thickness of the at least one plastic lens element is CT, and the following condition is satisfied:

$-2 \leq H2/CT \leq 0.$

5. The lens driving apparatus of claim 4, wherein the extending distance of the light-shielding layer from the top surface to the image side of the lens driving apparatus along the direction parallel to the optical axis is H2, the central thickness of the at least one plastic lens element is CT, and the following condition is satisfied:

$-1 \leq H2/CT \leq 0.$

6. The lens driving apparatus of claim 1, wherein the peripheral portion of the at least one plastic lens element further comprises at least one outer tilting surface, a part of the light-shielding layer is coated on the at least one outer tilting surface, at least one angle is between the at least one outer tilting surface and the optical axis, and the at least one angle is between 1 degree and 60 degrees.

7. The lens driving apparatus of claim 6, wherein a number of the at least one outer tilting surface is N, and a number of the at least one angle between the N outer tilting surfaces and the optical axis is N, the N angles increase in order from the object side of the lens driving apparatus to an image side of the lens driving apparatus, and each of the N angles is between 1 degree and 39 degrees.

8. The lens driving apparatus of claim 1, wherein the imaging lens assembly further comprises an annular step structure, which surrounds the effective optical portion and is in a full-circle form, and the annular step structure connecting the effective optical portion and the peripheral portion.

9. The lens driving apparatus of claim 8, wherein a part of the light-shielding layer is coated on the annular step structure.

10. The lens driving apparatus of claim 1, further comprising:
a leaf spring element, which is assembled with the carrier element, wherein the leaf spring element is located at an image side of the carrier element.

11. The lens driving apparatus of claim 10, further comprising:
at least one metal conductive element, which is directly contacted with the carrier element, and the at least one metal conductive element located at one of an object side and the image side of the carrier element.

12. The lens driving apparatus of claim 11, wherein the at least one metal conductive element comprises at least two positioning holes, which are coupled with the carrier element.

13. The lens driving apparatus of claim 11, wherein the at least one metal conductive element is disposed between the carrier element and the leaf spring element.

14. The lens driving apparatus of claim 1, wherein an appearance of one side of the carrier element towards an image side of the lens driving apparatus is a polygon.

15. The lens driving apparatus of claim 14, wherein the polygon being rectangular-shaped has a plurality of chamfered corners.

16. The lens driving apparatus of claim 15, wherein a number of the at least one coil is at least two, which are correspondingly disposed along the optical axis of the imaging lens assembly, and are disposed on two sides of the polygon being rectangular-shaped which are correspondingly disposed.

17. The lens driving apparatus of claim 15, wherein at least two gate traces are respectively disposed on the at least two chamfered corners.

18. An electronic device, comprising:
the lens driving apparatus of claim 1.

* * * * *